US012095244B2

(12) United States Patent
Vastmans et al.

(10) Patent No.: US 12,095,244 B2
(45) Date of Patent: Sep. 17, 2024

(54) COMPOSITE CABLE SEAL

(71) Applicant: COMMSCOPE TECHNOLOGIES LLC, Hickory, NC (US)

(72) Inventors: Kristof Vastmans, Kessel-Lo (BE); Jiri Zavrel, Leuven (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 247 days.

(21) Appl. No.: 17/763,469

(22) PCT Filed: Sep. 24, 2020

(86) PCT No.: PCT/US2020/052498
§ 371 (c)(1),
(2) Date: Mar. 24, 2022

(87) PCT Pub. No.: WO2021/061988
PCT Pub. Date: Apr. 1, 2021

(65) Prior Publication Data
US 2022/0337044 A1    Oct. 20, 2022

Related U.S. Application Data

(60) Provisional application No. 62/904,956, filed on Sep. 24, 2019, provisional application No. 62/951,422, (Continued)

(51) Int. Cl.
*H02G 15/013* (2006.01)
*G02B 6/44* (2006.01)

(52) U.S. Cl.
CPC ........ *H02G 15/013* (2013.01); *G02B 6/4444* (2013.01)

(58) Field of Classification Search
None
See application file for complete search history.

(56) References Cited

U.S. PATENT DOCUMENTS 1,851,940 A * 3/1932 Williams .................. F16L 5/08
                                                174/152 G
3,339,011 A * 8/1967 Ewers, Jr. ............ H02G 15/013
                                                138/89.1

(Continued)

FOREIGN PATENT DOCUMENTS

DE    4028570 A1 *   3/1992
EP    0408967 A2 *   1/1991
(Continued)

OTHER PUBLICATIONS

English_Translation_FR3002376. France. (Year: 2014).*
(Continued)

*Primary Examiner* — Timothy J. Dole
*Assistant Examiner* — Muhammed Azam
(74) *Attorney, Agent, or Firm* — Merchant & Gould P.C.

(57) ABSTRACT

A composite cable seal includes a frame material and a sealing material. The frame material can be configured to control positioning of the sealing material, and to prevent the sealing material from being over-compressed. The sealing material can be configured to provide effective sealing at a cable port and to provide effective sealing with respect to the enclosure (e.g., at a triple point of the enclosure).

47 Claims, 20 Drawing Sheets

Related U.S. Application Data filed on Dec. 20, 2019, provisional application No. 62/967,417, filed on Jan. 29, 2020, provisional application No. 63/025,683, filed on May 15, 2020.

(56) References Cited

U.S. PATENT DOCUMENTS

| | | | | |
|---|---|---|---|---|
| 3,946,144 | A * | 3/1976 | Quante | H02G 15/113 174/92 |
| 4,079,193 | A * | 3/1978 | Channell | H02G 15/013 277/917 |
| 4,103,911 | A * | 8/1978 | Giebel | H02G 15/013 277/606 |
| 4,117,259 | A * | 9/1978 | Giebel | H02G 15/113 174/92 |
| 4,179,319 | A * | 12/1979 | Lofdahl | B32B 27/08 428/137 |
| 4,232,184 | A * | 11/1980 | Faust | H02G 15/013 174/41 |
| 4,715,571 | A * | 12/1987 | Soltow | F16L 3/22 24/339 |
| 4,769,513 | A * | 9/1988 | Ragland | G02B 6/4476 174/76 |
| 4,880,676 | A * | 11/1989 | Puigcerver | H02G 15/013 174/91 |
| 4,888,070 | A * | 12/1989 | Clark | H02G 15/1806 174/76 |
| 5,006,669 | A * | 4/1991 | Bachel | H02G 15/192 174/92 |
| 5,109,458 | A * | 4/1992 | Dixit | G02B 6/4428 385/102 |
| 5,198,620 | A * | 3/1993 | Behrendt | H02G 15/013 174/74 A |
| 5,254,808 | A * | 10/1993 | Rodrigues | H02G 15/013 174/660 |
| 5,331,114 | A * | 7/1994 | Rudolph | H02G 15/013 174/76 |
| 5,442,140 | A * | 8/1995 | Mc Grane | F16L 5/14 174/93 |
| 5,443,232 | A * | 8/1995 | Kesinger | H02G 3/263 248/62 |
| 5,498,839 | A * | 3/1996 | Behrendt | H02G 15/013 174/92 |
| 5,738,147 | A * | 4/1998 | Mestres | F16L 5/14 248/68.1 |
| 5,775,702 | A * | 7/1998 | Laeremans | G02B 6/4471 174/152 G |
| 5,816,736 | A * | 10/1998 | Kroulik | B25J 19/0025 403/385 |
| 5,886,300 | A * | 3/1999 | Strickler | G02B 6/4444 174/92 |
| 5,912,433 | A * | 6/1999 | Pulido | H02G 15/113 174/92 |
| 6,046,406 | A * | 4/2000 | Milanowski | H02G 15/013 174/94 S |
| 6,107,571 | A * | 8/2000 | Damm | H02G 15/013 174/75 C |
| 6,118,076 | A * | 9/2000 | Damm | H02G 15/113 174/92 |
| 6,376,777 | B1 * | 4/2002 | Ito | H02G 3/088 174/152 G |
| 6,462,275 | B1 * | 10/2002 | Daoud | H02G 3/088 439/604 |
| 6,533,472 | B1 * | 3/2003 | Dinh | G02B 6/4447 385/95 |
| 6,578,800 | B2 * | 6/2003 | Stefan | B25J 19/0025 248/52 |
| 6,672,900 | B2 * | 1/2004 | France | H01R 13/6273 439/589 |
| 6,730,846 | B1 * | 5/2004 | Muller | H02G 15/013 174/93 |
| 7,316,518 | B2 * | 1/2008 | Sasaki | H02G 15/013 403/313 |
| 7,316,591 | B2 * | 1/2008 | Ferderer | H01R 13/506 439/716 |
| 7,355,130 | B2 * | 4/2008 | Holman | H02G 3/088 174/152 G |
| 7,442,884 | B2 * | 10/2008 | Ball | H02G 15/113 16/2.2 |
| 7,446,267 | B2 * | 11/2008 | Hedstrom | F16L 5/02 174/650 |
| 7,668,431 | B2 * | 2/2010 | Cox | G02B 6/44775 385/134 |
| 8,152,537 | B1 * | 4/2012 | Montena | H01R 13/5205 439/98 |
| 8,152,559 | B1 * | 4/2012 | Montena | H01R 13/5205 439/775 |
| 8,232,474 | B2 * | 7/2012 | Yribarren | H02G 3/38 174/99 R |
| 8,636,524 | B2 * | 1/2014 | Montena | H01R 13/5205 174/92 |
| 8,642,891 | B2 | 2/2014 | Berghmans et al. | |
| 9,175,791 | B2 | 11/2015 | McCoy | |
| 9,765,908 | B2 * | 9/2017 | Andersson | F16L 5/14 |
| 9,837,806 | B1 * | 12/2017 | Komori | H01B 7/28 |
| 10,094,491 | B1 * | 10/2018 | Crounse | F16L 3/1008 |
| 10,461,463 | B2 * | 10/2019 | Schoenfeld | H01R 13/518 |
| 10,656,356 | B2 * | 5/2020 | Bryon | G02B 6/4446 |
| 2002/0180163 | A1 * | 12/2002 | Muller | H02G 15/013 277/602 |
| 2005/0116122 | A1 * | 6/2005 | Nakanishi | F16L 3/223 248/68.1 |
| 2005/0227535 | A1 * | 10/2005 | Holman | H02G 3/088 439/587 |
| 2013/0146720 | A1 * | 6/2013 | Meyers | F16L 55/035 248/68.1 |
| 2014/0077409 | A1 * | 3/2014 | Satou | B26D 3/003 264/154 |
| 2015/0357809 | A1 * | 12/2015 | Coenegracht | H02G 3/088 277/616 |
| 2016/0268719 | A1 | 9/2016 | Madinabeitia et al. | |
| 2018/0003910 | A1 | 1/2018 | Menguy | |
| 2018/0157002 | A1 * | 6/2018 | Bishop | H02G 15/013 |
| 2018/0301883 | A1 * | 10/2018 | Nowastowski-Stock | H05K 5/0247 |
| 2019/0237954 | A1 * | 8/2019 | Ferderer | H02G 15/013 |

FOREIGN PATENT DOCUMENTS

| | | | | |
|---|---|---|---|---|
| EP | 1760506 | A2 * | 3/2007 | F16L 5/10 |
| EP | 2216867 | A2 * | 8/2010 | G02B 6/4471 |
| EP | 0243222 | B1 * | 11/2012 | |
| EP | 2523287 | A1 * | 11/2012 | G02B 6/4444 |
| FR | 2748867 | A1 * | 11/1997 | H02G 15/013 |
| GB | 2195840 | A * | 4/1988 | H02G 15/013 |
| JP | H10-042439 | A | 2/1998 | |
| JP | 2006-004843 | A | 1/2006 | |
| JP | 2006-294417 | A | 10/2006 | |
| WO | WO-9609671 | A1 * | 3/1996 | H02G 15/007 |
| WO | WO-9626566 | A1 * | 8/1996 | H02G 15/013 |
| WO | 97/02637 | A1 | 1/1997 | |
| WO | WO-9702635 | A1 * | 1/1997 | H02G 15/013 |
| WO | 2016/071394 | A2 | 5/2016 | |
| WO | 2017/167819 | A1 | 10/2017 | |
| WO | 2020/061283 | A1 | 3/2020 | |
| WO | WO-2020086942 | A1 * | 4/2020 | G02B 6/4472 |

OTHER PUBLICATIONS

International Search Report and Written Opinion of the International Searching Authority for International Patent Application No. PCT/US2020/052498 mailed Jan. 12, 2021, 15 pages.

Extended European Search Report for Application No. 20869049.5 mailed Sep. 20, 2023.

* cited by examiner

COMPOSITE CABLE SEAL

CROSS-REFERENCE TO RELATED APPLICATIONS

This application a National Stage Application of PCT/US2020/052498, filed on Sep. 24, 2020, which claims the benefit of U.S. Patent Application Ser. No. 62/904,956, filed on Sep. 24, 2019, and claims the benefit of U.S. Patent Application Ser. No. 62/951,422, filed on Dec. 20, 2019, and claims the benefit of U.S. Patent Application Ser. No. 62/967,417, filed on Jan. 29, 2020, and claims the benefit of U.S. Patent Application Ser. No. 63/025,683, filed on May 15, 2020, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers. It is often preferred for the telecommunications enclosures to be re-enterable. The term "re-enterable" means that the telecommunications enclosures can be re-opened to allow access to the telecommunications components housed therein without requiring the removal and destruction of the telecommunications enclosures. For example, certain telecommunications enclosures can include separate access panels that can be opened to access the interiors of the enclosures and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, or other structures. Further enclosures include domes attached to bases via clamps. Telecommunications enclosures are typically sealed to inhibit the intrusion of moisture or other contaminants. An example sealed enclosure is disclosed by PCT International Publication Number WO 2017/167819.

SUMMARY

One aspect of the present disclosure relates to a cable seal adapted for sealing a cable entrance/exit location of a telecommunications enclosure. The cable seal can be adapted for sealing a cable port and for providing sealing with respect to a housing of the enclosure. In certain examples, the cable seal has a composite construction adapted to effectively seal a triple point of the telecommunications enclosure located at an interface between two pieces of the housing. In certain examples, the triple point can include a gasket such as an O-ring that provides a perimeter seal between the housing pieces of the enclosure and that extends across a portion of the cable seal.

In certain examples, the cable seal can have a composite construction which includes first and second different materials. The first and second different materials can include a frame material and a sealing material.

In certain examples, the frame material can be configured to provide stored energy when compressed, to control positioning of the sealing material, and to prevent the sealing material from being over-compressed when pressurized between housing pieces.

In certain examples, the sealing material can be configured to provide effective sealing at a cable port and to also provide effective sealing with respect to the enclosure (e.g., at a triple point of the enclosure).

In certain examples, the sealing material can be molded over and through the frame material.

In certain examples, the frame material is an elastomeric material that is harder than the sealing material.

In certain examples, the frame material can include an elastomeric rubber construction.

In certain examples, the sealing material can include an elastomeric rubber construction or a gel construction.

In certain examples, the sealing material has a hardness of 15 Shore A or softer, and the frame material has an elastomeric construction having a hardness of 30 Shore A or harder.

In certain examples, the cable seal defines at least one cable port.

In certain examples, the cable port is lined by the sealing material which defines a circumferential rib within the cable port.

In certain examples, the cable seal can include flanges having a composite construction and includes both the frame material and the sealing material.

In certain examples, the frame material can define at least a portion of a peripheral surface of the cable seal that is intended to contact a sealing gasket of a telecommunications enclosure. In certain examples, the composite construction of the flanges assists in maintaining proper positioning of the sealing material at a triple point of the enclosure, and prevents the sealing material from being over-compressed or torn when the cable seal is compressed during closing of the enclosure.

In certain examples, the cable seal can include a tapered access slit for providing a wrap-around configuration that allows a fiber optic cable to be inserted into a cable port of the cable seal. Preferably, the slit is predefined during forming of the cable seal and optionally can have a tapered, wedge shape.

In certain examples, the cable seal can provide effective sealing without the use of a lubricant such as grease. In other examples, the cable seal can be used in combination with lubricant and can include a peripheral surface defined by the sealing material which includes a groove for providing effective containment and positioning of lubricant (e.g., factory installed lubricant) relative to the cable seal.

In certain examples, the cable seal can be configured to ensure the effective positioning of grease adjacent a triple point of the enclosure during insertion of the cable seal into the enclosure.

In certain examples, cable seals in accordance with the principles of the present disclosure can be configured to be mounted in a side-by-side arrangement within a telecommunications enclosure and can be adapted such that the flanges of adjacent ones of the cable seals contact one another to provide a continuous seal that extends between the adjacent cable seals. In certain examples, the contact regions between the adjacent cable seals can be provided exclusively by the sealing material. In certain examples, the frame material of the cable seals define peripheral surfaces that are contacted by the gasket as the gasket extends across the top sides of the cable seals. The frame material can provide reinforcing that prevents the sealing gasket from over-compressing, tearing, displacing or otherwise damaging the sealing material when the telecommunications enclosure is closed.

Other aspects of the present disclosure relate to plugs for temporarily blocking cable ports in cable seals, wherein the plugs do not physically contact at least certain cable sealing surfaces of the cable seals.

In one example, the cables sealing surfaces that are not physically contacted are defined by sealing ribs located within the cable ports. In one example, the cable ports include enlarged inner and outer pockets separated by the sealing rib, and the plugs seal against circumferential surfaces corresponding to the enlarged inner and outer pockets. In one example, the plugs include enlarged sealing heads that are co-axially aligned and connected at a fixed axial spacing by a plug-head spacer having a reduced cross-dimension as compared to the enlarged sealing heads. In one example, the cable sealing surfaces of the ribs define cable openings having cross-dimensions larger than the cross-dimensions of the plug-head spacers, and the plug-head spacers extend through the cable openings and do not physically contact the sealing surfaces.

Other examples of the present disclosure relate to an assembly including a cable seal defining cable ports, plugs for temporarily blocking the cable ports and a cable spacer for use in maintaining spacing between cables routed through the cable ports. In n one example, the plugs include exterior spacer holders for securing the cable spacer to the cable seal then the plugs are installed in the cable ports of the cable seal.

Another aspect of present disclosure relates to a plug for temporarily closing a cable port of a cable seal. The plug includes first and second enlarged heads that are co-axially aligned and connected together at a fixed axial spacing by a plug-head spacer. The plug-head spacer has a smaller cross-dimension as compared to the first and second enlarged heads. In one example, the plug is dumbbell shaped. In one example, each of the enlarged heads includes one or more disk-shaped sealing flanges. In one example, the enlarged heads include disk-shaped axial stop flanges having a larger cross-dimension that corresponding cross-dimensions of the sealing flanges.

Another aspect of the present disclosure relates to a cable spacer including parallel first and second cable-receiving channels arrangement back-to-back with open sides of the channels facing in opposite directions. In one example, the cable includes a first part that defines a first half of the first and second channels and a second part that defines a second half of the first and second channels. In one example, the channels extend along a length of the spacer between first and second opposite ends, and the first and second parts are pivotally connected by a hinge located at one of the ends. In one example, the spacer has a composite construction with each of the first and second parts including a plastic frame supporting an elastomeric material that defines the cable-receiving channels.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
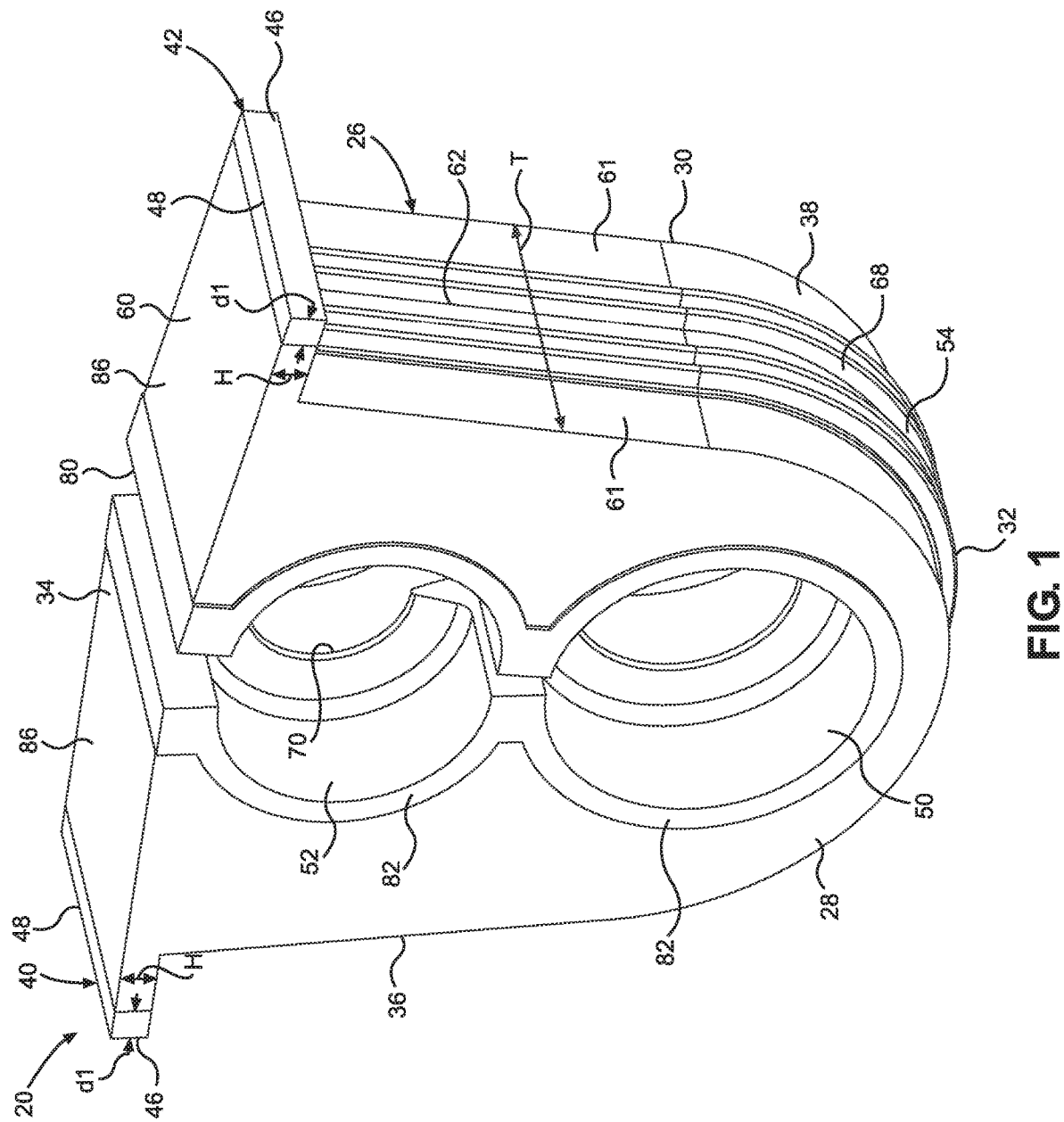
FIG. 1 is a perspective view of a cable seal in accordance with the principles of the present disclosure.

Various embodiments will be described in detail with reference to the drawings, wherein like reference numerals represent like parts and assemblies throughout the several views.

FIG. 1 depicts an example cable seal 20 in accordance with the principles of the present disclosure. The cable seal 20 can be adapted for sealing a cable entrance/exit location 22 (see FIG. 7) of a telecommunications enclosure 24. The cable seal 20 includes a sealing unit 26 having a first major side 28 positioned opposite from a second major side 30. The first and second major sides 28, 30 are separated by a thickness T of the sealing unit 26. The sealing unit has a profile P (see FIG. 2) defining a major axis D1 and a minor axis D2. The sealing unit profile P defines a length L that extends along the major axis D1 between opposite first and second ends 32, 34 of the sealing unit 28. The profile P defines a width W that extends along the minor axis D2 between opposite first and second sides 36, 38 of the sealing unit 26.

Figure 2:
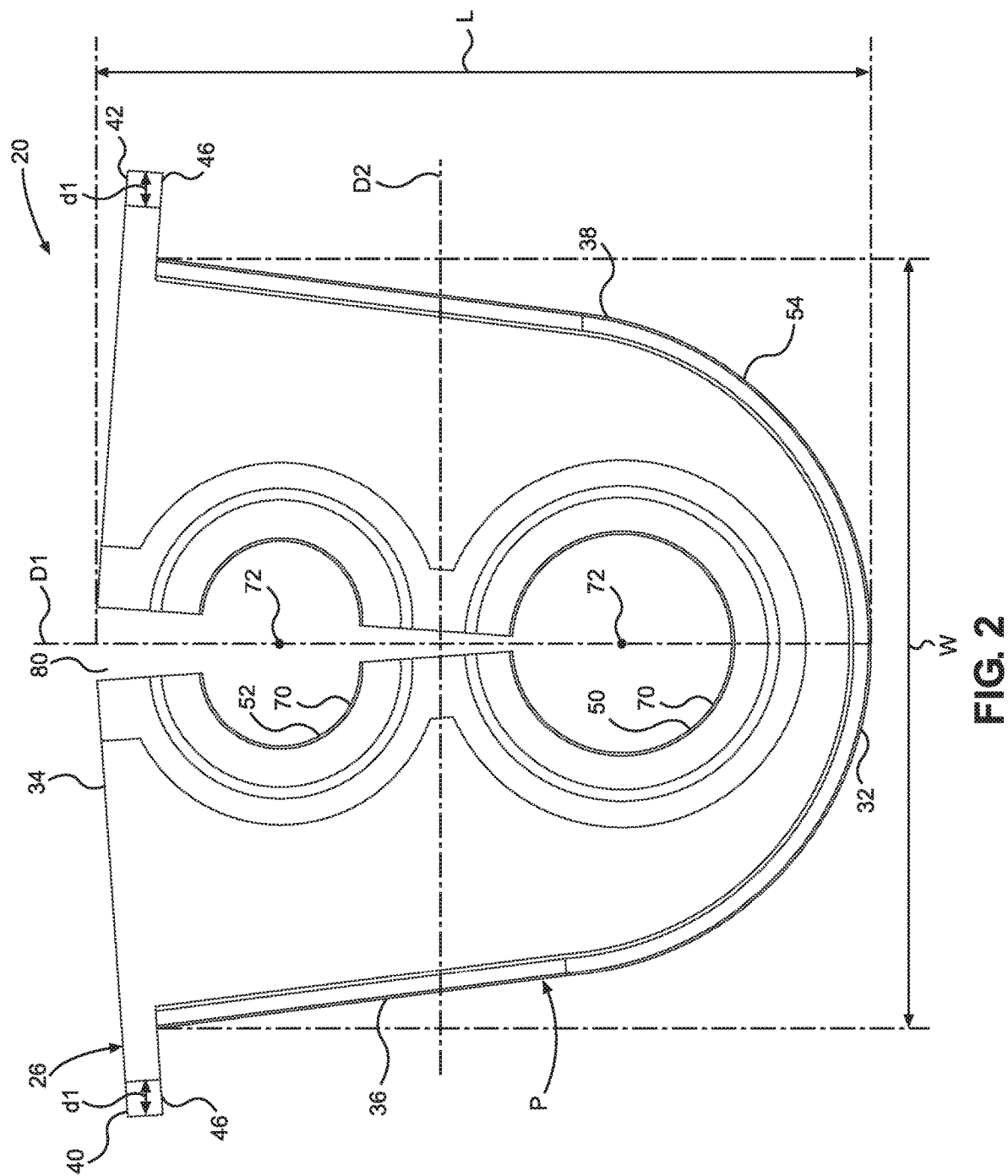
FIG. 2 is a front view of the cable seal of FIG. 1.

Referring still to FIGS. 1 and 2, the first end 32 of the sealing unit 26 is rounded along the profile P between the opposite first and second sides 36, 38. The sealing unit 26 includes first and second sealing flanges 40, 42 adjacent the second end 34 of the sealing unit that respectively project outwardly from the first and second sides 36, 38 of the sealing unit 26 in an orientation along the minor axis D2. Each of the first and second flanges 40, 42 includes a base end integral with a main body of the sealing unit 26 and a free end 46 located at an outermost extent portion 48 of each of the flanges 40, 42.

The sealing unit 26 further includes at least one cable port that extends through the thickness T of the sealing unit between the first and second major sides 28, 30. As depicted, the sealing unit 26 includes first and second cable ports 50, 52 that are aligned along the major axis D1 of the profile P and that extend through the thickness T of the sealing unit 26. The sealing unit 26 further includes a peripheral surface 54 that extends about a perimeter of the sealing unit 26. The perimeter of the sealing unit 26 extends around the first and second ends 32, 34 as well as the first and second sides 36, 38 of the sealing unit 26.

The sealing unit 26 has a composite construction including a frame material 60 and a sealing material 62. The sealing material 62 is molded over and through the frame material 60. Preferably, the frame material is harder than the sealing material 62. In some examples, the frame material can have an elastomeric construction. The sealing material 62 preferably lines the first and second cable ports 50, 52 and defines at least a portion of the peripheral surface 54 that extends along the first and second sides 36, 38 and the first end 32 of the sealing unit 26. Preferably, the frame material 60 and the sealing material 62 cooperate to define each of the first and second sealing flanges 40, 42.

In certain examples, the frame material 60 and the sealing material 62 both have an elastomeric construction, with the frame material 60 being harder than the sealing material 62. In certain examples, the construction of the frame material 60 is adapted to provide stored energy when compressed, to control positioning of the sealing material 62, to provide containment and protection of the sealing material 62, and to prevent the sealing material 62 from being over-compressed when the sealing unit is installed within the telecommunications enclosure 24. In certain examples, the construction of the sealing material 62 can be configured to provide effective sealing at the cable ports 50, 52 and to also provide effective sealing about the periphery of the sealing unit 26 with respect to housing of the telecommunications enclosure 24. In certain examples, the configuration of the flanges 40, 42, which include a composite construction including both the frame material 60 and the sealing material 62, provides effective sealing at a triple point location of the enclosure 24 where a gasket extends over the second end 34 of the cable seal 20. In certain examples, the gasket is adapted to provide perimeter sealing between first and second housing pieces 64, 66 (e.g., a base and a cover of a housing of the telecommunications enclosure 24) that meet at an interface that corresponds with the second ends 34 of cable seals 20 installed within the telecommunications enclosure 24.

In certain examples, the sealing material 62 has hardness of 15 Shore A or softer. In certain examples, the sealing material 62 has a hardness in the range of 5-15 Shore A. In certain examples, sealing material 62 can include an elastomeric gel or an elastomeric rubber. In certain examples, the sealing material includes a thermoplastic elastomeric rubber, a thermoset elastomeric rubber, a thermoplastic elastomeric gel or a thermoset elastomeric gel. In certain examples, the sealing material is a thermoplastic elastomer (e.g., rubber, gel) having a hardness in the range of 5-25 Shore A, or in the range of 5-20 Shore A, or in the range of 10-15 Shore A.

In certain examples, the frame material 60 includes a thermoplastic or thermoset elastomeric rubber. In certain examples, the frame material 60 has a hardness of 30 Shore A or harder. In certain examples, the frame material has a hardness in the range of 30-60 Shore A. In certain example, the frame material can have a molded plastic construction and can have a hardness of at least 40 Shore A, or at least 50 Shore A, or at least 60 Shore A, or at least 70 Shore A, or at least 80 Shore A, or at least 90 Shore A, or at least 100 Shore A, or at least 70 Shore D, or in the range of 50 Shore A to 70 Shore D, or in the range of 60-100 Shore A. Harder plastic frames may be more elastic than viscoelastic in construction, while softer rubber-like frames may exhibit more viscoelastic properties. In certain examples, the frame material 60 has a plastic composition that include a polymer such as polyethylene or polypropylene. In one example, the frame material 60 has a composition that includes a plastic polymer such as polyethylene or polypropylene and a thermoplastic elastomer such as a styrenic block copolymer. In one example, the composition can be a blend of the plastic polymer such as polyethylene or polypropylene and the thermoplastic elastomer such as a styrenic block copolymer. In one example, the frame material 60 has a composition that includes 70-95 percent plastic polymer and 5-30 percent thermoplastic elastomer. In another example, the frame material 60 has a composition that includes 80-95 percent plastic polymer and 5-20 percent thermoplastic elastomer. In a further example, the frame material 60 has a composition that includes 85-95 percent plastic polymer and 5-15 percent thermoplastic elastomer. In certain examples, the frame material having the blended composition can have a hardness greater than 30 or 40 Shore A.

It is preferred for the cable seal 20 to provide effective sealing without the need for using a lubricant such as grease. However, for certain applications, the use of lubricants such as grease may be desirable. To accommodate lubricant, the peripheral surface 54 defined by the sealing material 62 includes a peripheral groove 68 that extends about at least a portion of the perimeter of the sealing unit 26 for holding grease or other lubricant or sealing material. The lubricant can be placed in the groove 68 in the factory as part of the manufacturing process, to eliminate the need for applying the lubricant in the field. An example lubricant includes Molycote® brand lubricant sold by Dow Corning. In certain examples, the peripheral groove 68 extends from the first sealing flange 40, along the first side 36, around the first end 32, and along the second side 38 to the second flange 42. It will be appreciated that when the sealing unit 26 is mounted within a corresponding pocket defined by a housing of a telecommunications enclosure, grease or other lubricant that has been preinstalled within the peripheral groove 68 assists in inserting the sealing unit 26 into the pocket. Additionally, during the insertion process, lubricant within the peripheral groove 68 is forced upwardly toward the flanges 40, 42 such that a supply of lubricant is provided beneath the flanges 40, 42 for effectively providing triple point sealing of the enclosure. In certain examples, the sealing unit 26 can be configured with a tapered configuration such that the width W decreases as the sealing unit 26 extends toward the first end 32 of the sealing unit 26. The tapered configuration of the sealing unit 26 assists in providing compression of the sealing unit 26 when the sealing unit 26 is installed within a pocket of the telecommunications enclosure 24. Compression of the sealing unit 26 can result in the frame material 60 being pressurized to provide stored energy for maintaining sealing at the periphery of the sealing unit 26 and at the cable ports 50, 52. In situations where lubricant such as grease is used within the peripheral groove 68, the tapered configuration of the sealing unit 26 assists in forcing lubricant toward the region beneath the flanges 40, 42 during the seal insertion process.

Figure 7:
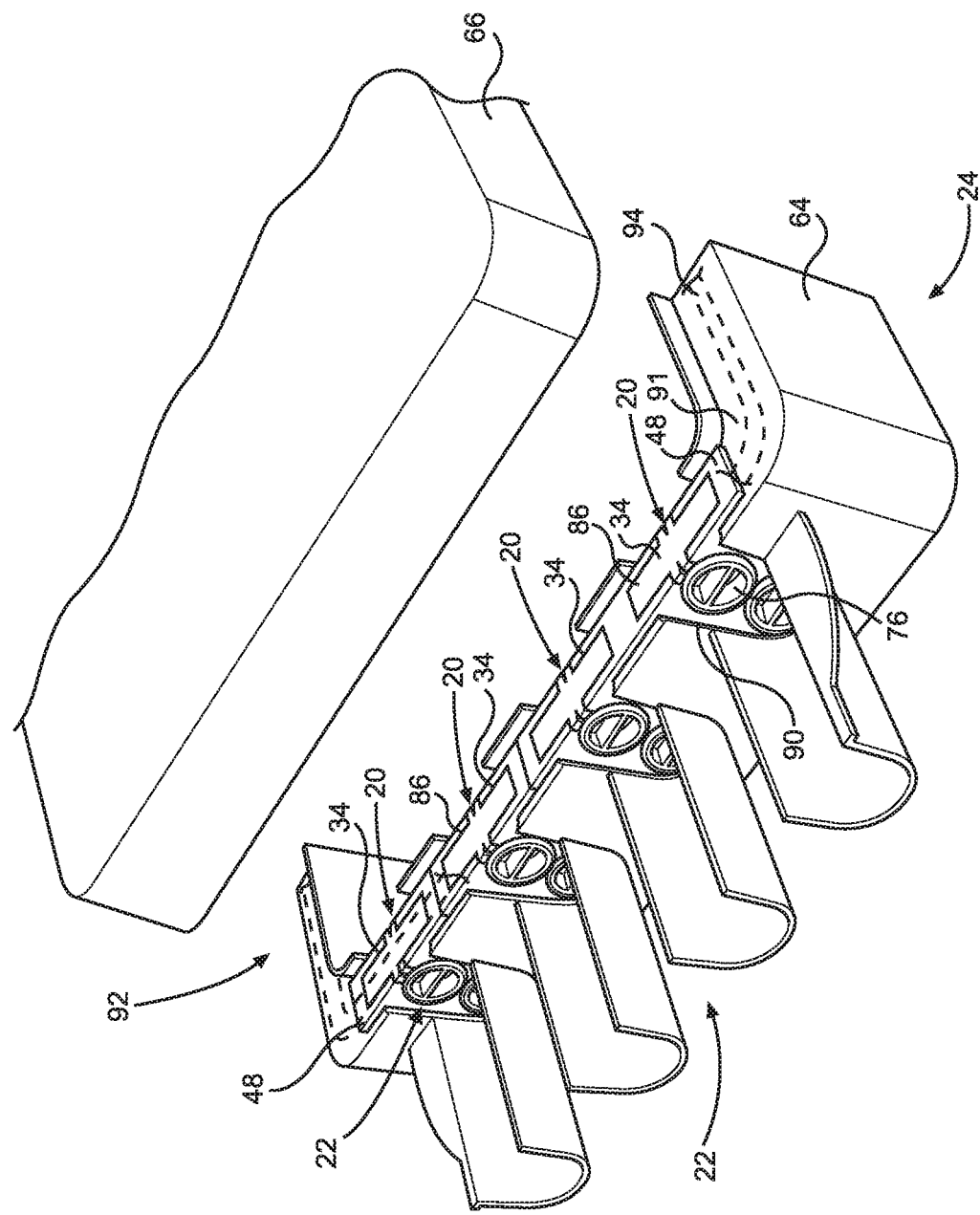
FIG. 7 depicts a telecommunications enclosure in accordance with the principles of the present disclosure with a plurality of the cable seals of FIG. 1 mounted therein.
Figure 8:
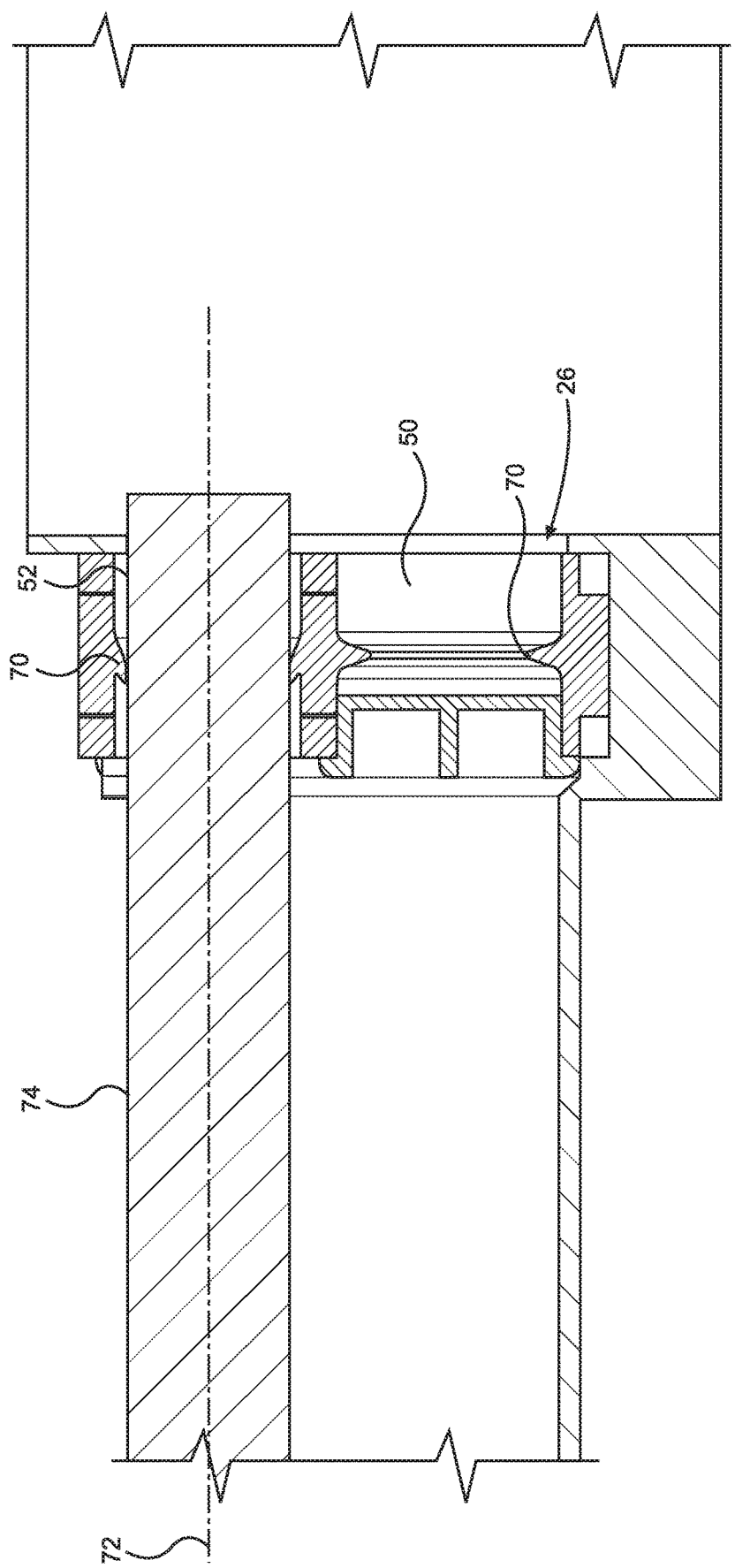
FIG. 8 is a cross-sectional view through the cable ports of the cable seal of FIG. 1 with a cable shown sealed within one of the cable ports.

In certain examples, the sealing material 62 can include structures that enhance cable sealing at the cable sealing ports 50, 52 and also provide cable range-taking functionality that allows the cable ports 50, 52 to accommodate cables having different diameters or sizes. In the depicted example, the sealing material 62 defines circumferential cable sealing ribs 70 at each of the first and second cable ports 50, 52. The cable sealing ribs 70 encircle port axes 72 of the cable ports 50, 52. As shown at FIG. 8, the cable sealing ribs 70 are adapted to project radially inwardly toward the cable axes 72. As also shown at FIG. 8, the cable sealing ribs 70 are configured to deflect radially outwardly from the axes 72 to accommodate cables of different sizes. As shown at FIG. 8, the second cable port 52 is shown receiving a cable 74 and the corresponding cable sealing rib 70 is shown outwardly deflected so as to accommodate the cable 74 while maintaining sealing contact about the circumference of the cable 74. It will be appreciated that when the cable ports 50, 52 are vacant, the cable ports can be enclosed by plugs that engage the sealing ribs 70. Example plugs 76 are shown at FIG. 7.

The first and second flanges 40, 42 have a composite construction that assists in effectively providing sealing within a telecommunications enclosure 24, particularly at triple points of telecommunications enclosures 24. In certain examples, the outermost extent portions 48 of the first and second sealing flanges 40, 42 are defined only by the sealing material 62. In certain examples, the outermost extent portions 48 are formed only by the sealing material 62 and have an outermost extent dimension d1 along the minor axis D2 that is less than or equal to 2 mm, or is less than or equal to 1 mm. In certain examples, the provision of the frame material 60 within the first and second flanges 40, 42 assists in preventing the sealing material 62 of the flanges 40, 42 from being over-compressed, displaced, torn or otherwise damaged during the installation process within the telecommunications enclosure 24. In certain examples, portions of the frame material 60 are adapted to absorb or transfer compression load which occurs when the housing pieces 64, 66 of the telecommunications enclosure 24 are secured together to prevent the sealing material 62 from being over-compressed. In certain examples, first and second flanges 40, 42 each include a flange height H that extends in an orientation along the major axis D1 of the sealing unit 26, and each of the first and second flanges 40, 42 includes a region 78 in which the frame material 60 defines the full flange height h. In certain examples, the regions 78 can include rails between which the sealing material 62 is contained. The regions 78 (e.g., rails or other regions) are adapted to prevent excessive deformation of the outermost extent portions 48. In certain examples, the rails extend from the base ends 44 of the first and second flanges 40, 42 along the minor axis D2 of the sealing unit 26 to the outermost extent portions 48 of the first and second flanges 40, 42.

In certain examples, the sealing unit 26 includes a predefined access slit 80 that extends along the major axis D1 of the sealing unit 26 from the second end 34 of the sealing unit, through the second port 52 and into the first port 50. The slit 80 provides the sealing unit 26 with a wrap-around configuration that allows the sealing unit 26 to be wrapped around cables desired to be inserted into either one of the cable ports 50, 52 thereby eliminating the need for axially threading the cable through the cable ports. In certain examples, the sealing unit 26 can flex about a hinge location adjacent the first end 32 to move between a closed position and an open position. FIG. 2 shows the sealing unit 26 partially flexed open about the hinge location such that the access slit 80 has a tapered wedge shape such that a width of the access slit 80 measured along the minor axis D2 of the sealing unit 26 decreases as the access slit 80 extends from the second end 34 of the sealing unit 26 toward the first end 32 of the sealing unit 26. By further flexing the sealing unit 26 open, cables can be loaded into the ports 50, 52 through the slit 80. When the sealing unit 26 is loaded into a pocket of an enclosure, the sealing unit 26 is compressed closed such that the access slit 80 is forced closed. In the case where the frame has a harder construction, the frame can include a flexible living hinge a the first end, or can be split into two half parts which are interconnected only by the sealing material 62 at a joint at the first end such that the sealing material 62 forms a hinge for allowing the sealing unit 26 to be flexed open.

Figure 3:
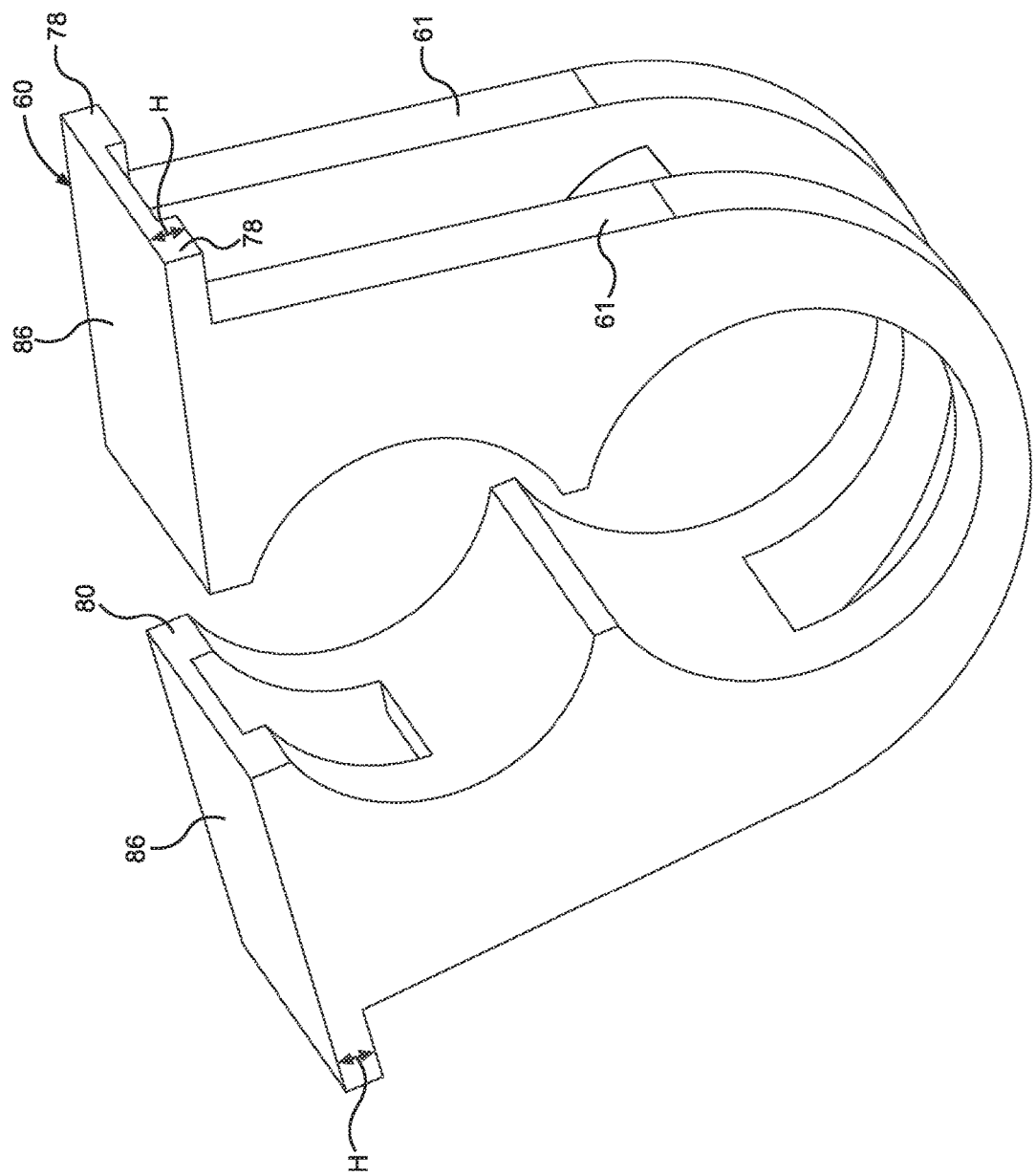
FIG. 3 is a perspective view a frame material of the cable seal of FIG. 1.
Figure 4:
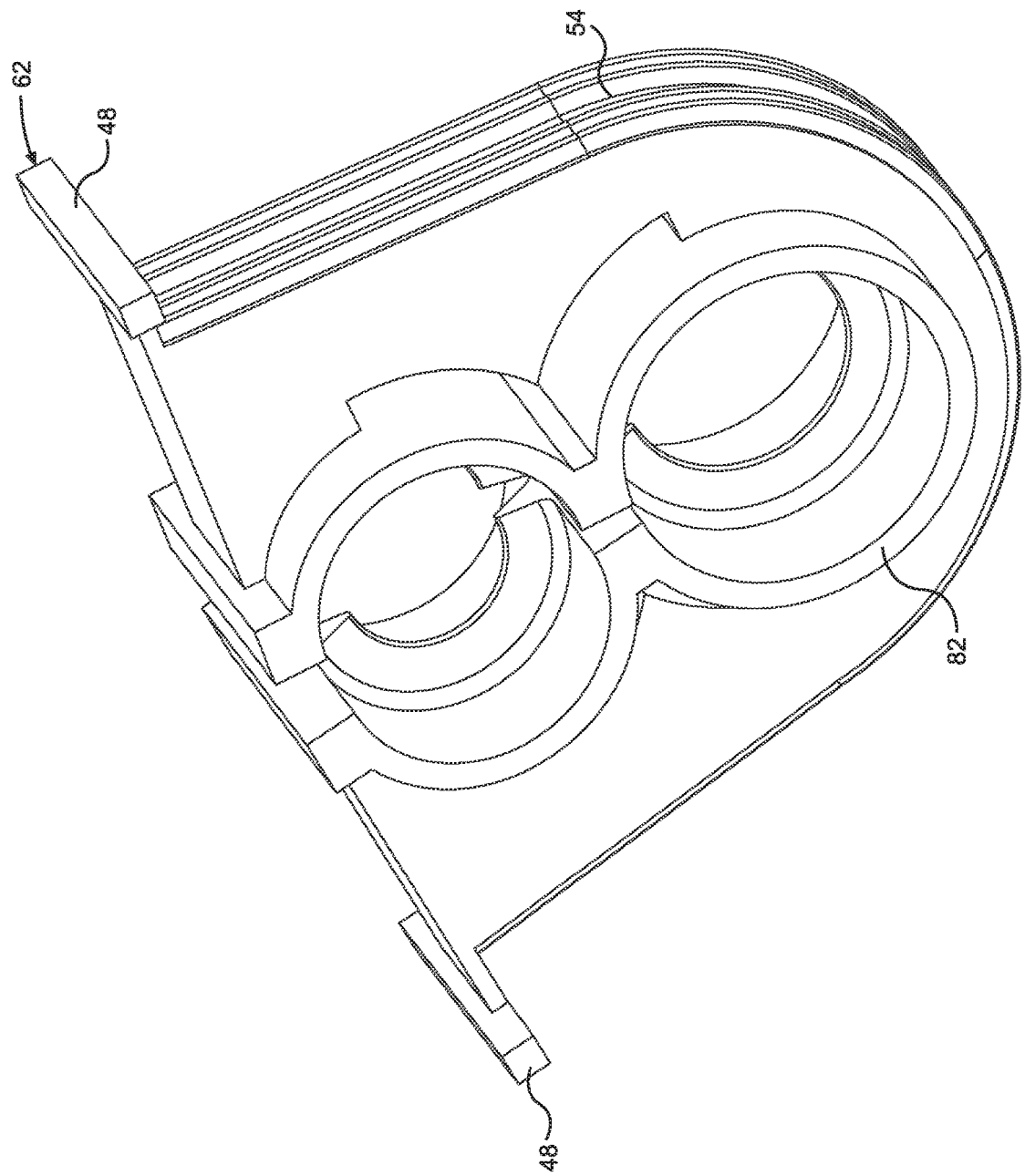
FIG. 4 is a perspective view of a sealing material of the cable seal of FIG. 1, the sealing material is molded over and through the frame material of FIG. 2.
Figure 5:
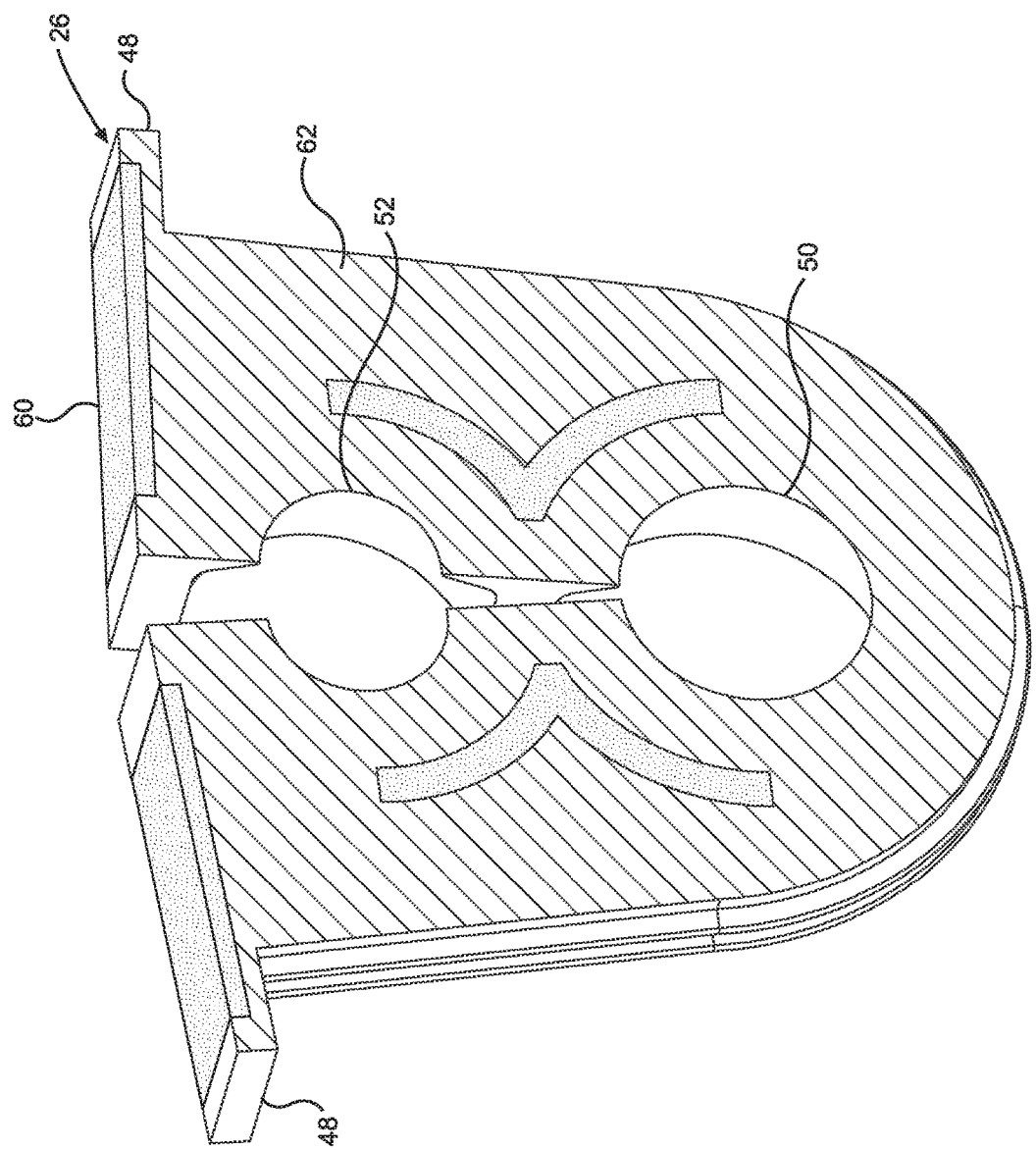
FIG. 5 is a cross-sectional view of the cable seal of FIG. 1.
Figure 6:
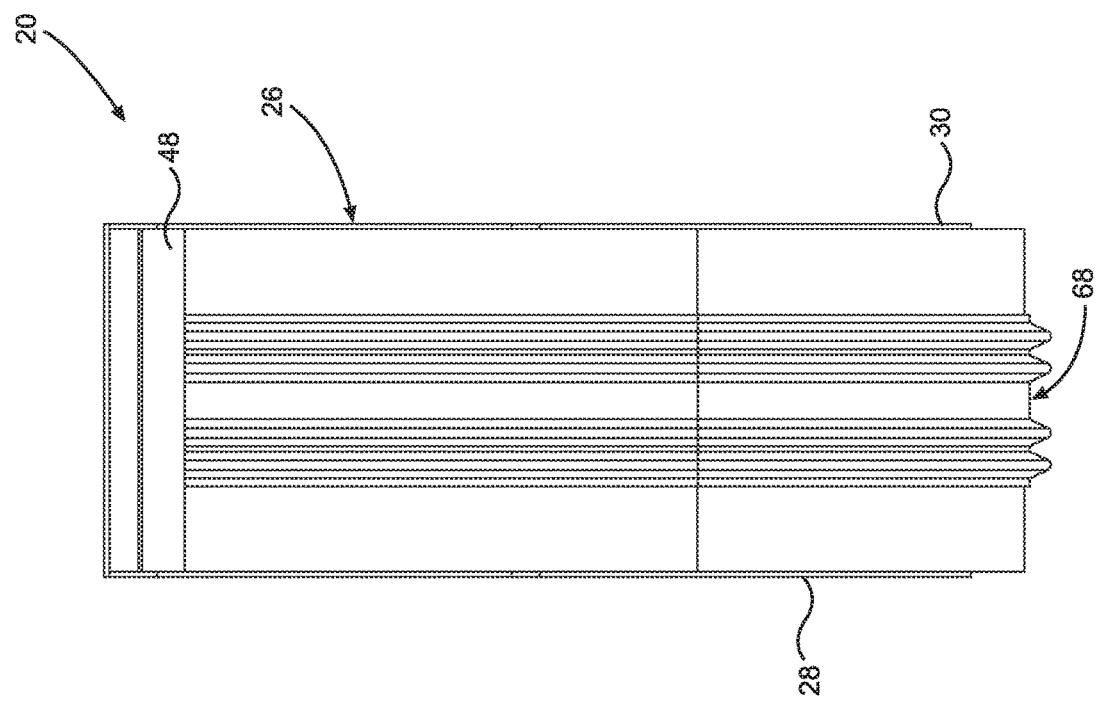
FIG. 6 is a side view of the cable seal of FIG. 1.

It will be appreciated that the sealing unit 26 can be manufactured by a molding process. The molding process can include an insert molding process. As part of the process, the frame material 60 can initially be molded within a mold cavity having an insert provided within the mold cavity for defining a precursor of the slit 80 defined by the frame material 60. Thereafter, the frame material 60 can be loaded into another mold cavity and the sealing material 62 can be molded over and through the frame material 60. An insert for the slit 80 can be provided within the second mold cavity. It will be appreciated that the frame material 60 is molded with an open interior region for allowing the sealing material 62 to flow into the interior of the frame material 60. It will be appreciated that the open configuration of frame 60 allows communication to be maintained between the sealing material 62 at the peripheral surface 54 of the sealing unit 26 and a lining portion 82 of the sealing material 62 which lines the first and second cable ports 50, 52 and the access slit 80. The sealing material 62 also flows between the rails 78 (see FIG. 3) of the flanges 40, 42 and defines the outer extant portions 48. In other examples, the slit 80 can be cut into the sealing unit after molding. In certain examples, the slit 80 can be molded with a slight taper along its length, but is can be configured to close when the sealing unit is compressed within a pocket of an enclosure.

In the depicted example, the frame 60 includes perimeter portions 61 (e.g., walls, rails, etc.) on opposite sides of the sealing material 62 that extend about the peripheral surface 54. In certain examples, the perimeter portions 61 extend along the first and second sides 36, 38 and along the first end 32 of the sealing unit 26. Thus, the sealing material 62 and the frame material 60 cooperate to define the peripheral surface 54. The perimeter portions 61 of the frame material 60 can form rail or wall-like structures that assist in protecting the sealing material 62 from the outside environment and for containing the sealing material 62 when the sealing unit 26 is inserted within a pocket of the telecommunications enclosure 24.

The frame material 60 also defines a section 86 of the peripheral surface 54 that extends along the minor axis D2 of the sealing unit 26 at the second end 34 of the sealing unit 26. The section 86 of the peripheral surface defined by the frame material 60 extends along a majority of the width W of the sealing unit 26 and is adapted for contacting a gasket (e.g., an O-ring seal) of the telecommunications enclosure 24 that is routed across the second end 34 of the sealing unit 26 when the sealing unit 26 is installed within the telecommunications enclosure. Contact between the gasket and the more robust frame material 60 prevents the less robust sealing material 62 from being over-compressed, torn or displaced by the gasket when the telecommunications enclosure 24 is closed.

FIG. 7 shows the enclosure 24 with the plurality of the sealing units 26 mounted within pockets 90 of the enclosure. The telecommunications enclosure 24 includes a housing including the first housing piece 64 and the second housing piece 66. The first and second housing pieces 64, 66 meet at an interface 92 sealed by a gasket 94 such as an O-ring seal or other seal (e.g., square, oval, etc.). The sealing units 26 are mounted within the pockets 90 with the second ends 34 located at the interface. The flanges 40, 42 overhang a seal support surface 91 defined by the first housing piece 64 (e.g., the base). The gasket 94 is routed over the second ends 34 of the sealing unit 26. The relatively soft nature of the sealing material 62 provides effective sealing at the transition (e.g., the triple point) where the gasket extends from the gasket support surface 91 to the second ends 34 of the sealing units 26. The flanges 40, 42 are sized and configured such that the flanges 40, 42 of adjacent ones of the sealing units 26 contact one another when installed within the housing. As depicted, the gasket 94 extends across the outermost extent portions 48 of the flanges 40, 42 and also extends across and contacts the peripheral surface defined by the frame material 60. When the first and second housing pieces 64, 66 are secured together (e.g., via clamping), the gasket 94 is compressed down against the second ends 34 of the sealing units 26. However, the contact between the peripheral surface 86 of the frame material 60 causes compressive loading to be transferred through the frame material 60 rather than over-compressing the outermost extent portions 48 of the flanges 40, 42. In this way, the outermost extent portions 48 are prevented from being over-compressed, torn or improperly displaced by the gasket 94 during the seal compression process. The slits 80 of the sealing units 26 close and the sealing material conforms about the cables when the sealing units are compressed within the pockets of the enclosure.

Figure 9:
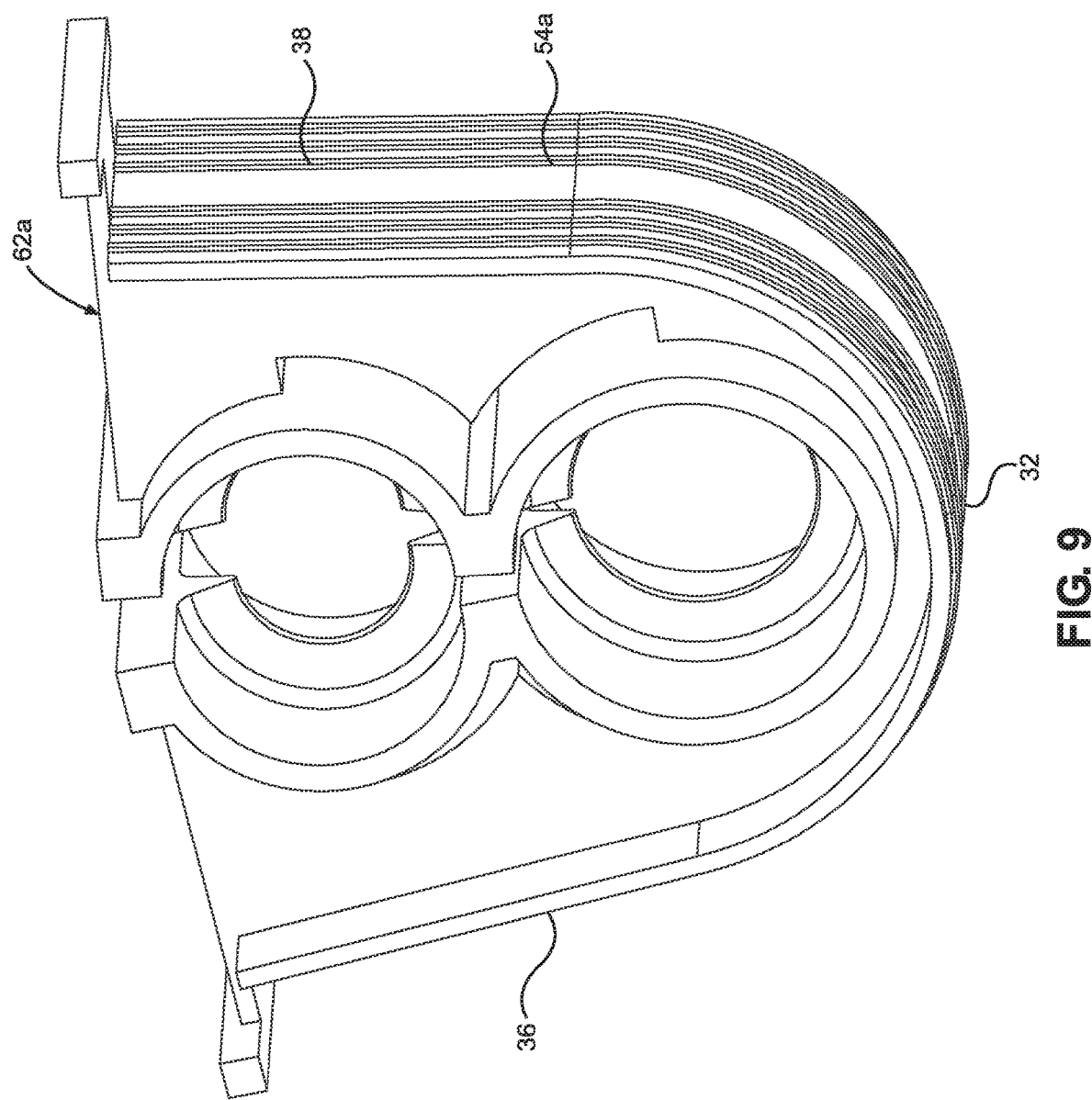
FIG. 9 is a perspective view of an alternative configuration for the sealing material of FIG. 3.
Figure 10:
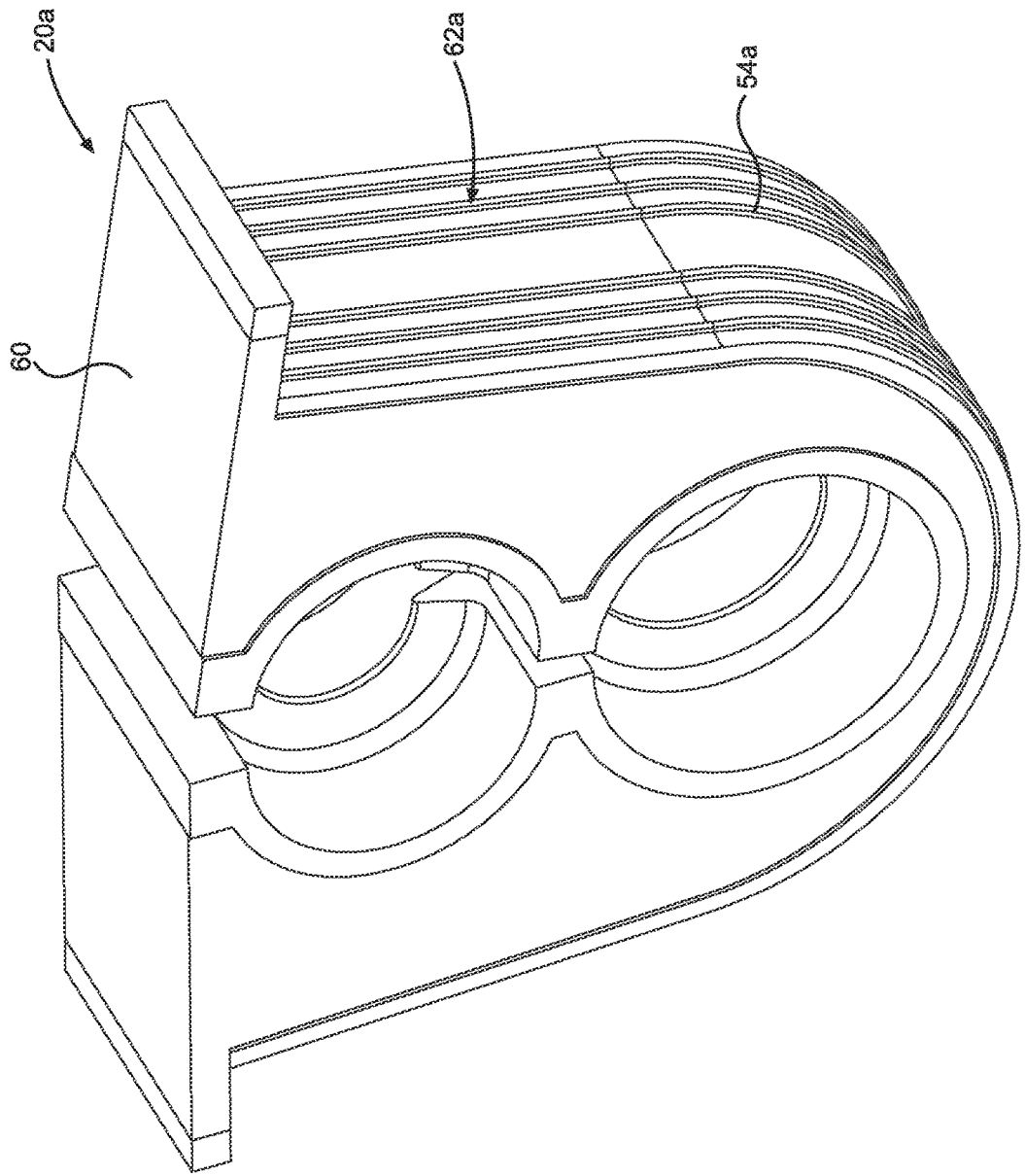
FIG. 10 shows the sealing material of FIG. 9 molded over and through the frame material of FIG. 3.
Figure 11:
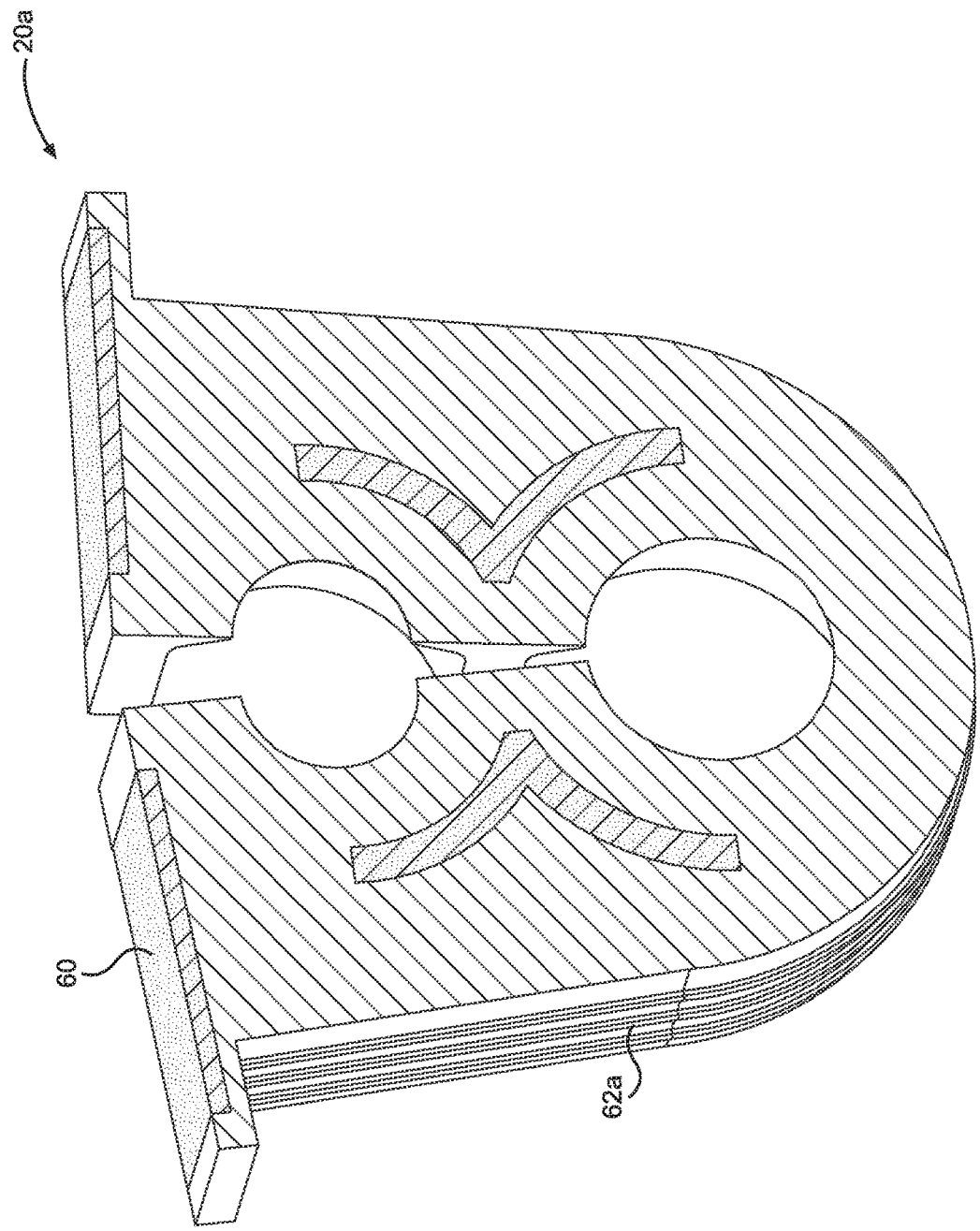
FIG. 11 is a cross-sectional view cut through the cable seal of FIG. 10.
Figure 12:
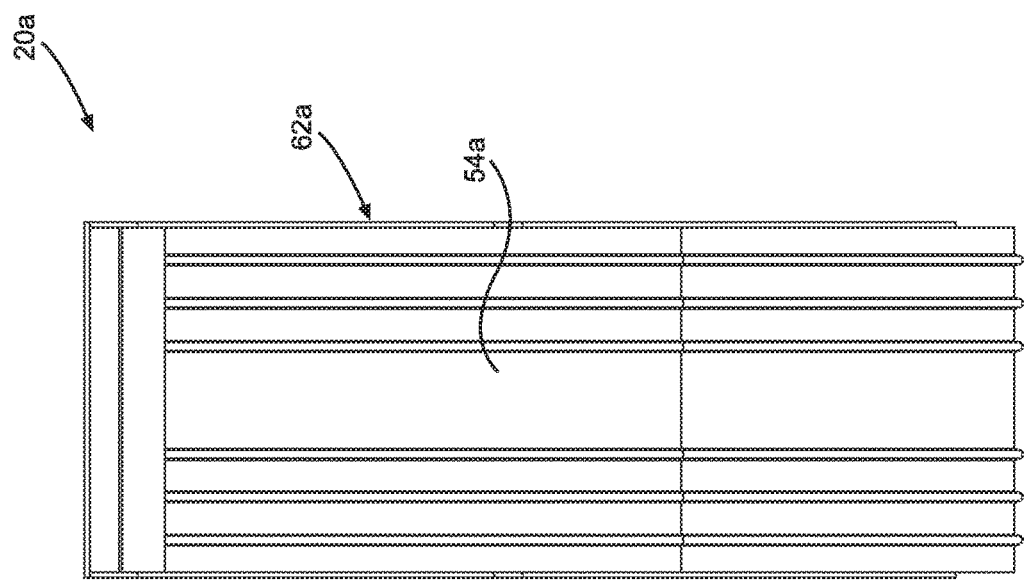
FIG. 12 is a side view of the cable seal of FIG. 10.
Figure 13:
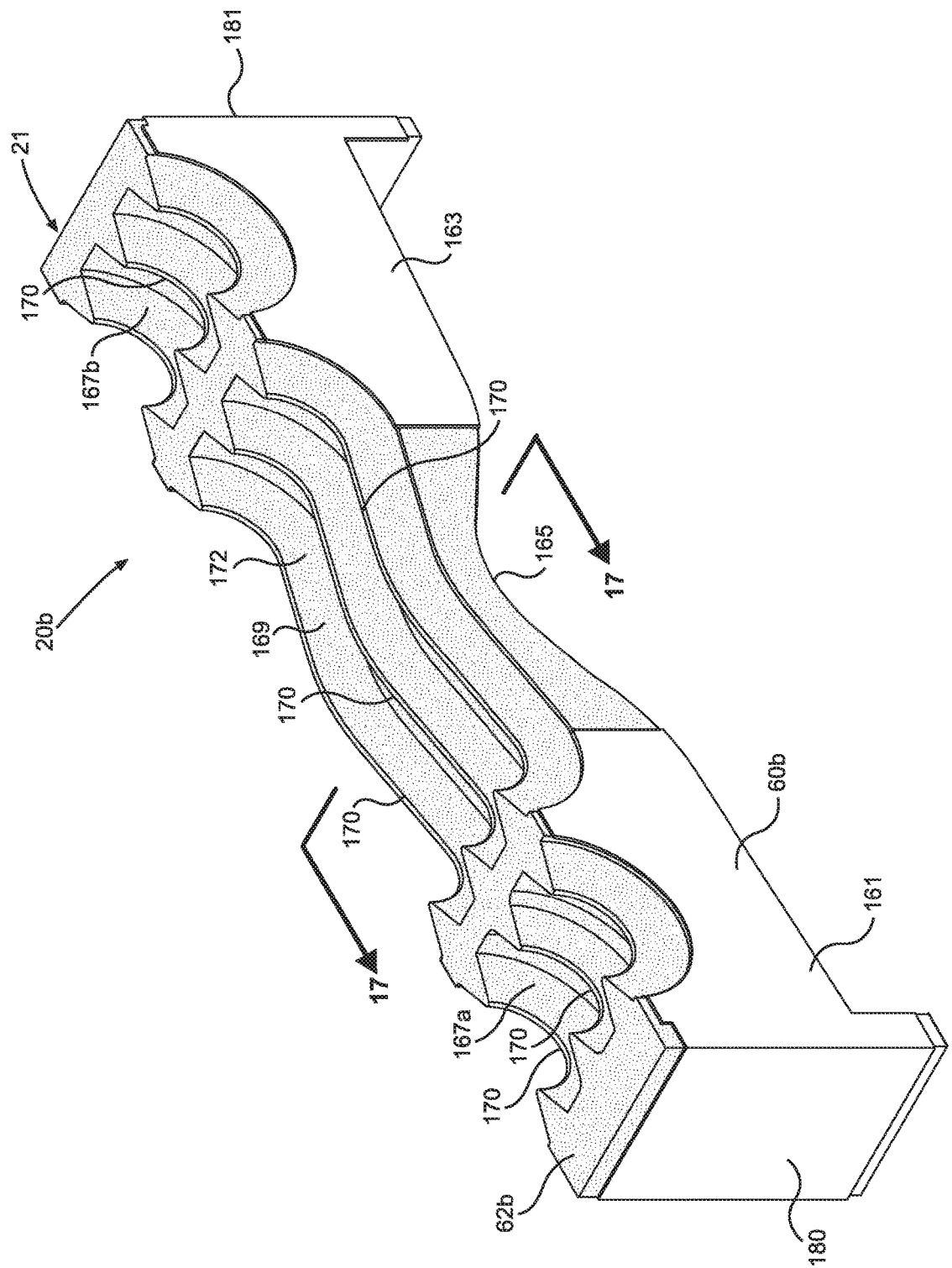
FIG. 13 is a perspective view of another cable sealing unit in accordance with the principles of the present disclosure.
Figure 14:
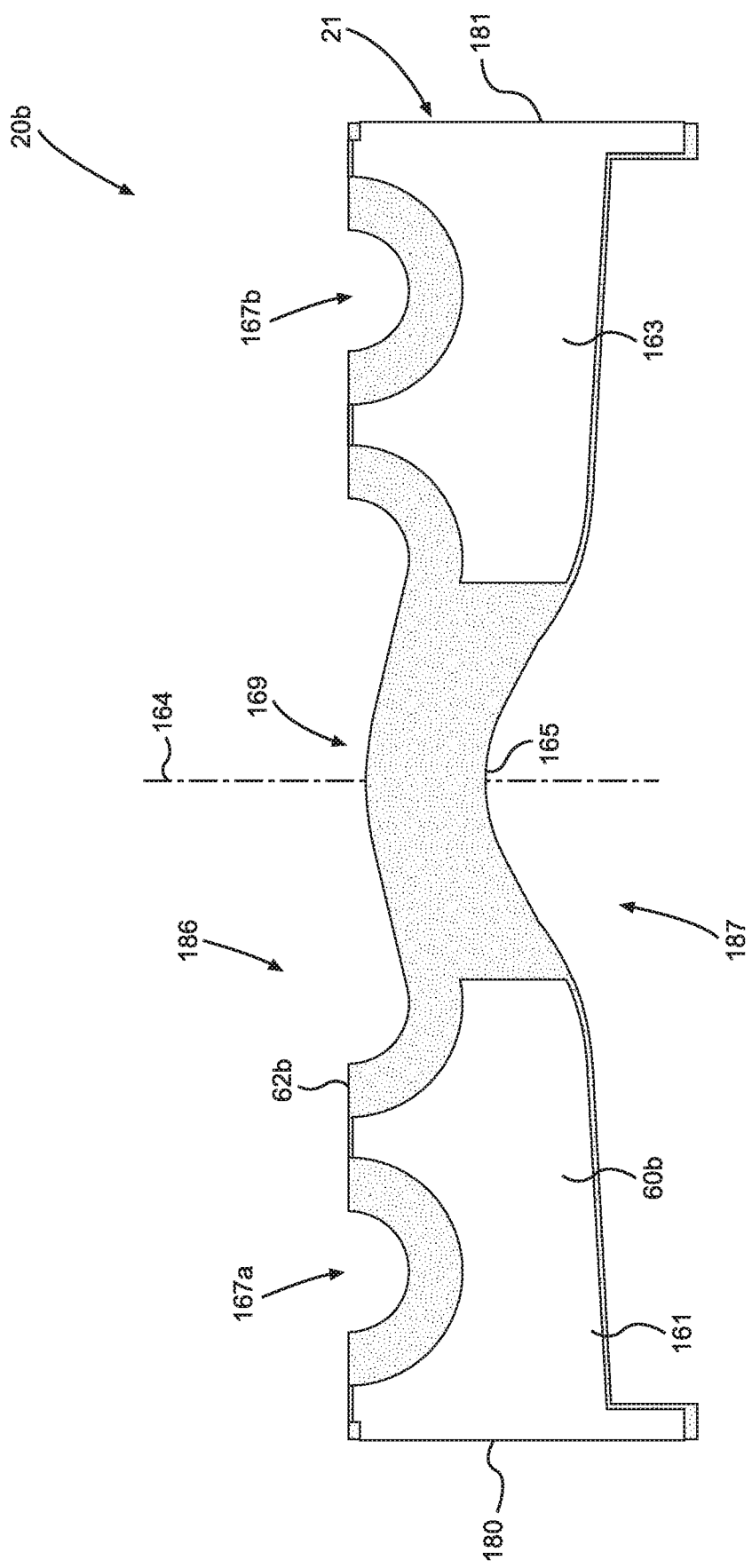
FIG. 14 is a front view of the cable sealing unit of FIG. 13.
Figure 15:
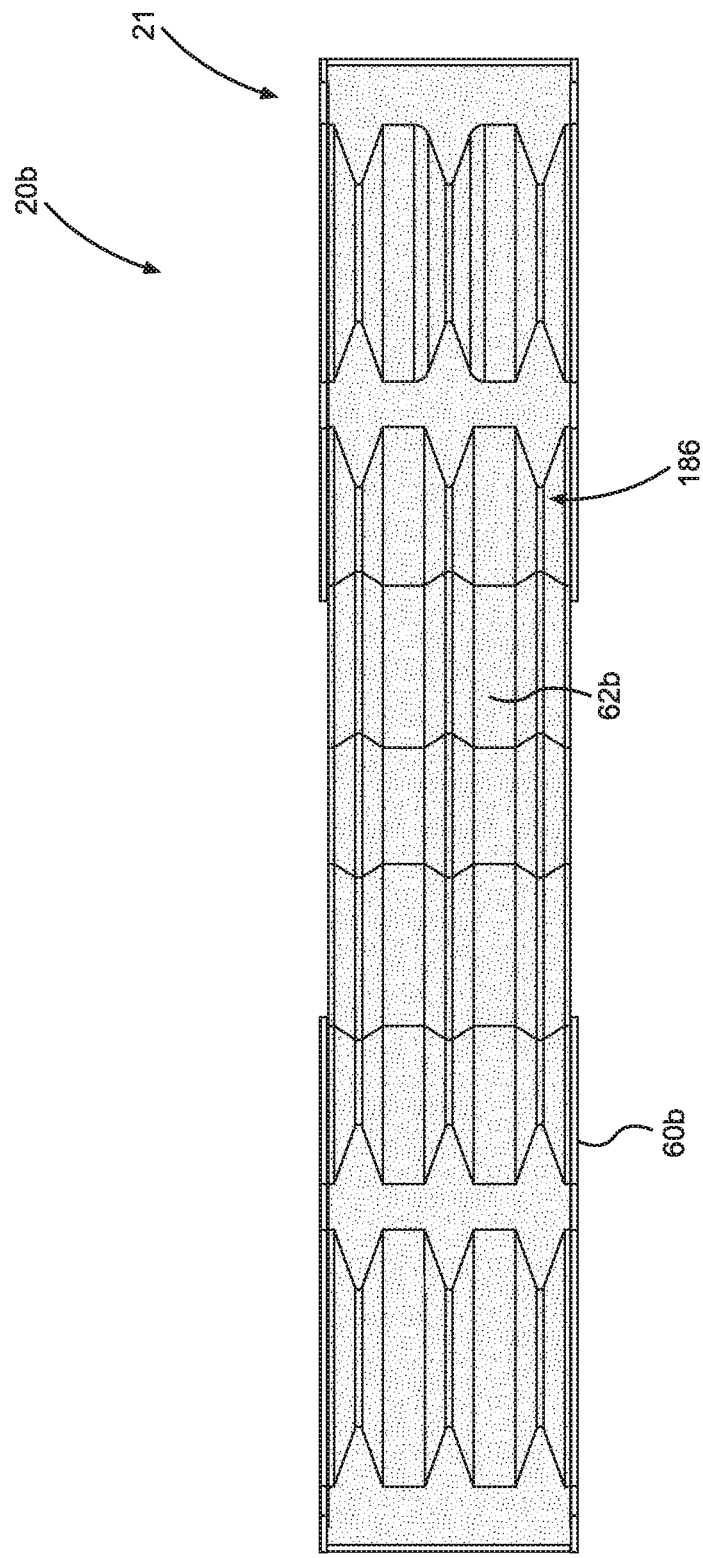
FIG. 15 is a top view of the cable sealing unit of FIG. 13.
Figure 16:
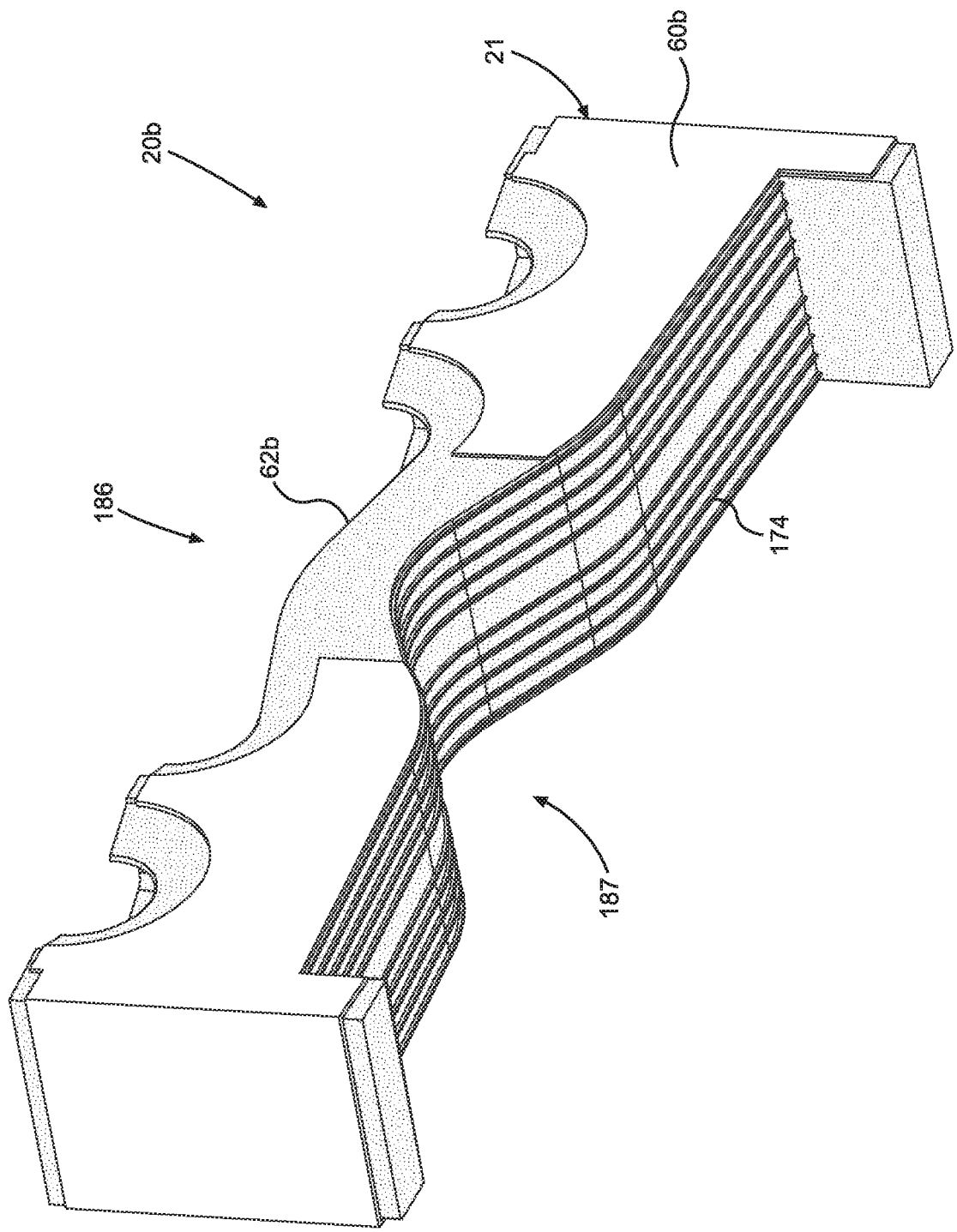
FIG. 16 is another perspective view of the cable sealing unit of FIG. 13.
Figure 17:
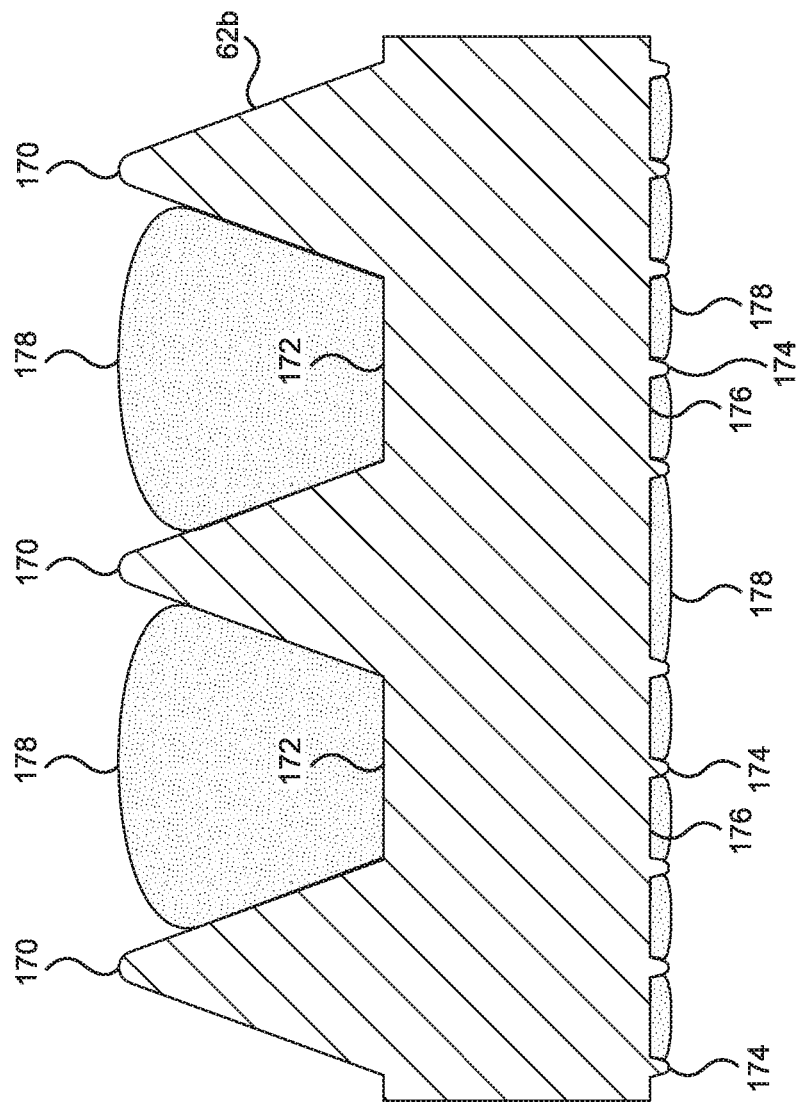
FIG. 17 is a cross-sectional view taken along section line 17-17 of FIG. 13.

FIGS. 10-12 depict another cable seal 20a in accordance with the principles of the present disclosure. Cable seal 20a has the same frame material 60 as the cable seal 20, but has a sealing material 62a (see FIG. 9) that has been modified to define the entire thickness of the peripheral surface 54a of the portion of the peripheral surface that extends along the sides 36, 38 and along the first end 32 of the cable seal 20a.

FIGS. 13-17 depict a further cable seal 20b in accordance with the principles of the present disclosure. The cable seal 20b includes a sealing unit 21 having a sealing material 62b and frame material 60b that can have compositions and material properties of any of the types previously described herein. The frame material 60b preferably has a multi-piece construction with pieces that are separate from one another or connected by a living hinge section of the frame material. In the depicted example, the frame material 60b includes first and second frame pieces 161, 163 positioned on opposite sides of a centerline 164 (see FIG. 14) that bisects the sealing unit 21. In the depicted example, the frame pieces 161, 163 are half-pieces and are symmetric about the centerline 164. The sealing unit 21 itself is also symmetric about the centerline 164.

The sealing material 62b is preferably molded over and through the frame pieces 161, 163 of the frame material 60b. The sealing material 62b defines a flexation region 165 located between the frame pieces 161, 163 adjacent the centerline 164. The flexation region 165 is configured to allow the sealing unit 21 to be flexed about the centerline from an open orientation (shown at FIGS. 13 and 14) to a closed orientation similar to the configuration of the seal 20 shown at FIG. 1. When in the closed orientation, the flexation region 165 is at a rounded first end of the unit 21 and opposite flanged ends 180, 181 of the sealing unit 21 are brought together to form a flanged second end of the sealing unit 21. It will be appreciated that the sealing unit 21 is configured to be wrapped around cables when moved from the open orientation to the closed orientation during installation in the pocket of an enclosure such as the enclosure 24 of FIG. 7.

To manufacture the sealing unit 21, the sealing material 62b is initially molded in a flat configuration (see FIGS. 13 and 14) with the first and second separate frame pieces 161, 163 being overmolded by the sealing material 62b as the sealing material 62b is molded in the flat configuration. The flat configuration corresponds to the open orientation of the sealing unit 21. Since the sealing unit is molded in the flat, open configuration, this configuration corresponds to a neutral or at rest state of the unit 21. The unit is flexed from the open, neutral state to the closed state during installation in an enclosure and the enclosure retains the unit 21 in the closed state when the unit 21 is installed in a pocket of the enclosure. The sealing unit 21 includes cable port-defining portions 167a, 167b and a cable port-defining portion 169. When the sealing unit 21 is moved to the closed orientation, the cable port-defining portions 167a, 167b cooperate to define one cable port and the cable port-defining portion 169 defines another cable port. The sealing unit 21 has a wrap-around configuration that allows the unit 21 to be wrapped around cables as the unit 21 is flexed from the opening orientation to the closed orientation such that the cables are captured within the cable ports as the sealing unit 21 is moved from the open, flat orientation to the closed orientation.

The sealing material 62b includes a plurality of axially spaced-apart cable sealing ribs 170 positioned at the cable port-defining portions 167a, 167b, 169 that extend circumferentially around the cable ports defined by the cable port-defining portions when the sealing unit is in the closed orientation. Inner grooves 172 are defined between the cable sealing ribs 170. The ribs can provide labyrinth type sealing about cables and can allow a wide range of cable sizes (e.g., a 5 millimeter range) to be accommodated. In one example, cables ranging from 11-16 millimeters in diameter can be accommodated. The sealing material 62b also includes a plurality of axially spaced-apart peripheral sealing ribs 174 that extend along opposite first and second sides and around the curved first end of the sealing unit when the sealing unit is in the closed orientation. In the flat configuration of FIG. 13, the ribs 170 are on one major side 186 of the sealing unit 21 and the ribs 174 are at an opposite major side 187 of the sealing unit 21. Outer grooves 176 are defined between the peripheral sealing ribs 174.

In certain examples, the inner and peripheral grooves contain a lubricant 178 (e.g., see FIG. 17) such as grease. In certain examples, the lubricant is factory installed in the grooves 172, 176 prior to shipment of the sealing unit 21 to the field and prior to installation of the sealing unit 21.

Figure 18:
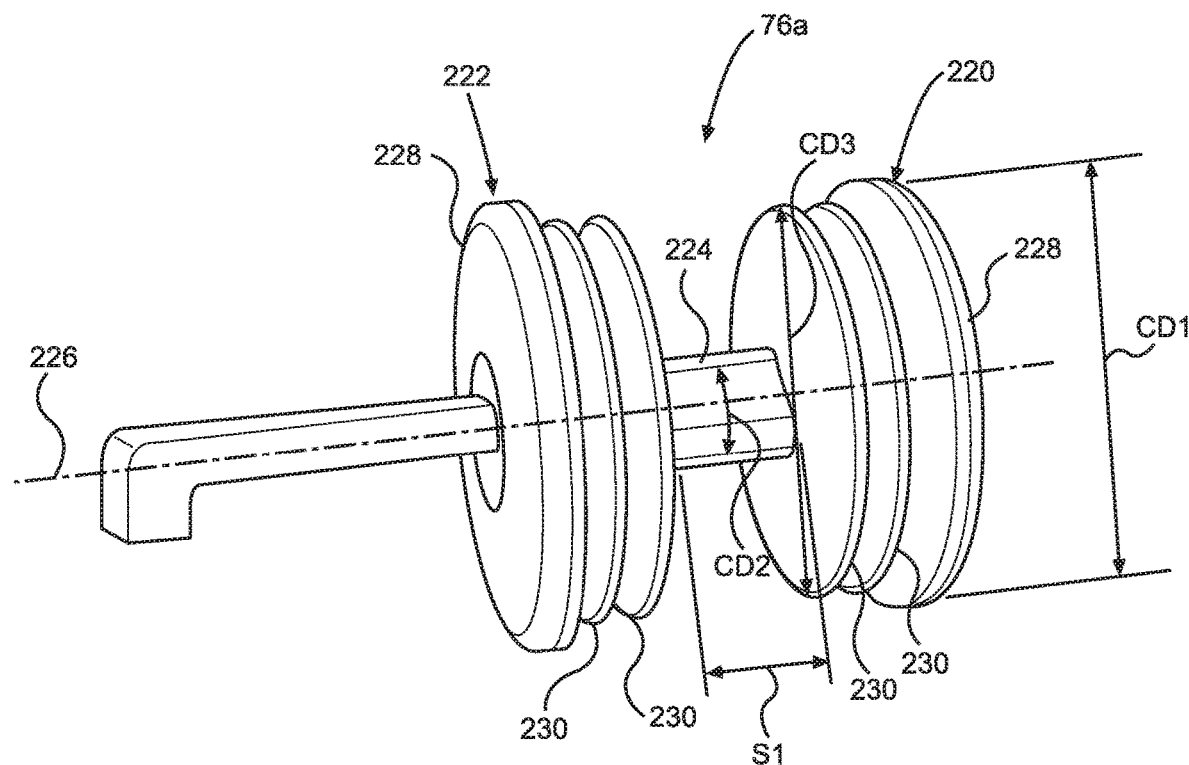
FIG. 18 depicts a plug in accordance with the principles of the present disclosure for temporarily blocking a cable port of a cable sealing unit in accordance with the principles of the present disclosure.

FIG. 18 depicts an alternative plug design in accordance with the principles of the present disclosure for use in protecting and sealing cable ports of a sealing unit such as the cable ports 50, 52 of the sealing unit 26. The plug design is depicted as a plug 76a which can be manufactured in different sizes to correspond with different sized ports (e.g., ports 50, 52). The plug 76a has a generally dumbbell-shaped configuration and includes inner and outer sealing heads 220, 222 interconnected by a plug-head spacer 224. Each of the sealing heads 220, 222 has a cross-dimension CD1 (e.g., an outer diameter) that is larger than a corresponding cross-dimension CD2 of the plug-head spacer 224. The plug-head spacer 224 extends along an axis 226 and maintains a fixed axial spacing S1 between the sealing heads 220, 222. Each of the sealing heads 220, 222 includes an axial stop feature and a port sealing feature. For example, each of the sealing heads 220, 222 includes an axial stop flange 228 defining the cross-dimension CD1 and at least one radial sealing flange 230 defining a cross-dimension CD3 larger than the cross-dimension CD2 of the plug-head spacer 224 and smaller than the cross-dimension CD1 of the axial stop flanges 228. In the depicted example, each of the sealing heads 220, 222 includes at least two of the radial sealing flanges 230. In the depicted example, the axial stop flanges 228 and the radial sealing flanges 230 are shown as circular disks separated by axial gaps. In one example, the plug 76a is a one-piece molded plastic body.

Figure 19:
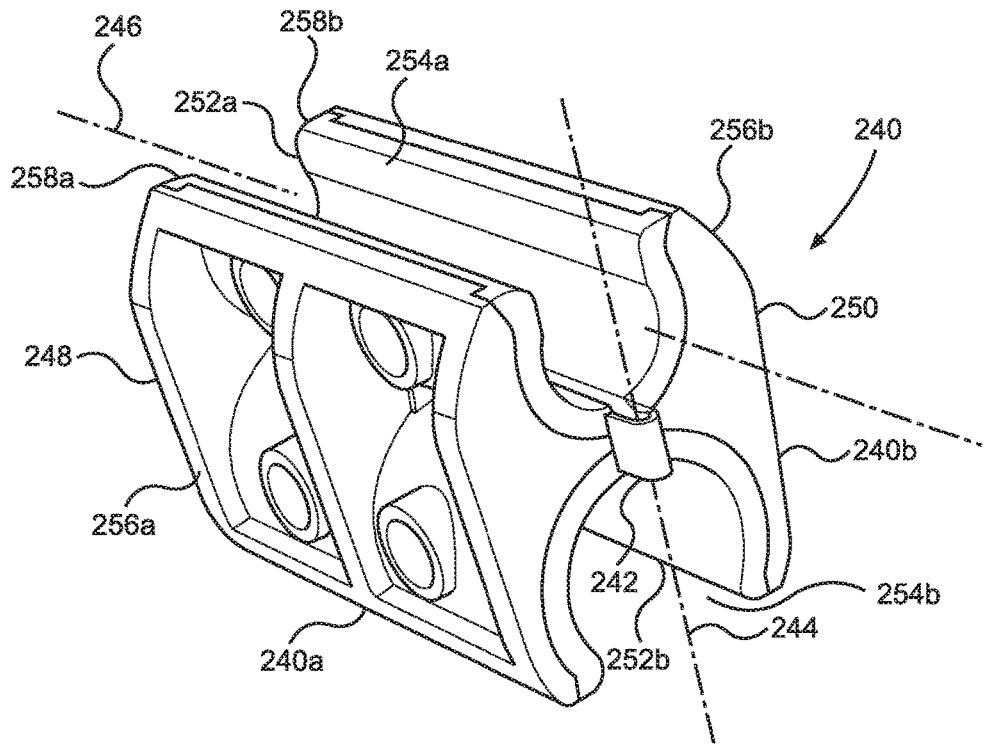
FIG. 19 depicts a cable spacer in accordance with the principles of the present disclosure for use in spacing cable routed through a cable sealing unit in accordance with the principles of the present disclosure.

FIG. 19 depicts a cable spacer 240 in accordance with the principles of the present disclosure for use in maintaining a preferred spacing between cables routed through cable ports of a sealing unit such as the cable ports 50, 52 of the sealing unit 26. The cable spacer 240 includes first and second parts 240a, 240b (e.g., half-pieces) connected at a hinge 242 located at an end of the spacer 240. As shown at FIG. 19, the first and second parts 240a, 240b are secured together (e.g., by a snap-fit connection, a latch, a fastener, a press-fit, or other mechanical connection arrangement) in a closed position. The hinge 242 allows the first and second parts 240a, 240b to be pivoted relative to one another about a pivot axis 244 between the closed position and an open position. The cable spacer 240 is elongate along a longitudinal axis 246 that extends between opposite first and second ends 248, 250 of the cable spacer 240. The hinge 242 is located at the first end 248. Each of the parts 240a, 240b defines a cable channel 252a, 252b having a length that extends along the longitudinal axis 246. The cable channels 252a, 252b have open sides 254a, 254b that face in opposite directions. The open sides 254a, 254b have lengths that extend along the longitudinal axis 246.

Figure 23:
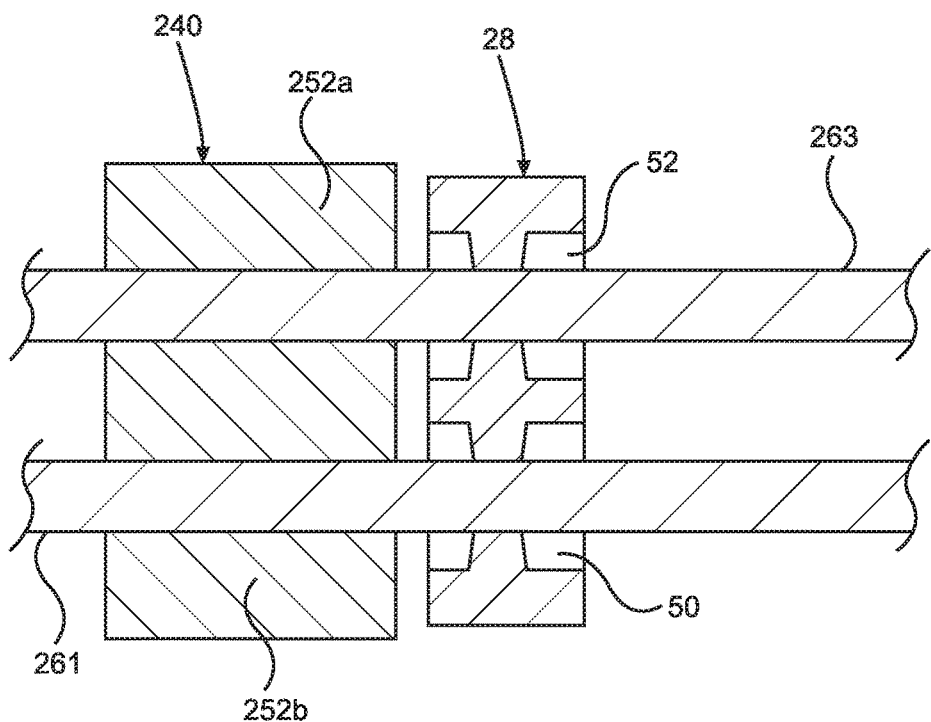
FIG. 23 is a cross-sectional view depicting the spacer of FIG. 19 being used to maintain parallel spacing between cables routed through ports of the cable seal of FIG. 1.

In certain examples, the cable spacer 240 can have a composite construction including a frame portion and a cable gripping portion. In one example, the frame portion is made of a material that is harder than the cable gripping portion. In one example the frame portion has a molded plastic construction and the cable gripping portion has an elastomeric construction (e.g., an elastomeric rubber). The frame portion can include first and second frame parts 256a, 256b connected by the hinge 242. The first and second frame parts 256a, 256b can respectively correspond to the first and second parts 240a, 240b. The gripping portion can include first and second gripping parts 258a, 258b respectively supported by the first and second frame parts 256a, 256b. The cable gripping parts 258a, 258b can respectively line or define the cable channels 252a, 252b and can be adapted for gripping cables routed longitudinally through the channels 252a, 252b. The channels 252a, 252b can have different sizes for accommodating different sized cables. The sizes of the channels 252a, 252b can correspond to the sizes of the cable ports 50, 52. The cable spacer 240 can be configured to assist in maintaining cables routed through the ports 50, 52 in parallel, spaced-apart relation with respect to one another. The cable spacer 240 also assists in keeping sections of the cables straight and in co-axial alignment with their respective cable ports 50, 52. FIG. 23 shows the cable spacer 240 positioned directly outside the sealing unit 26 (e.g., on the outside of the enclosure in which the sealing unit is installed) for maintaining spacing and parallelism between cables 261, 263 routed through the cable ports 50, 52. As a result, sections of the cables 261, 263 located immediately outside the sealing unit 26 are retained in co-axial alignment with their respective cable ports 50, 52.

Figure 20:
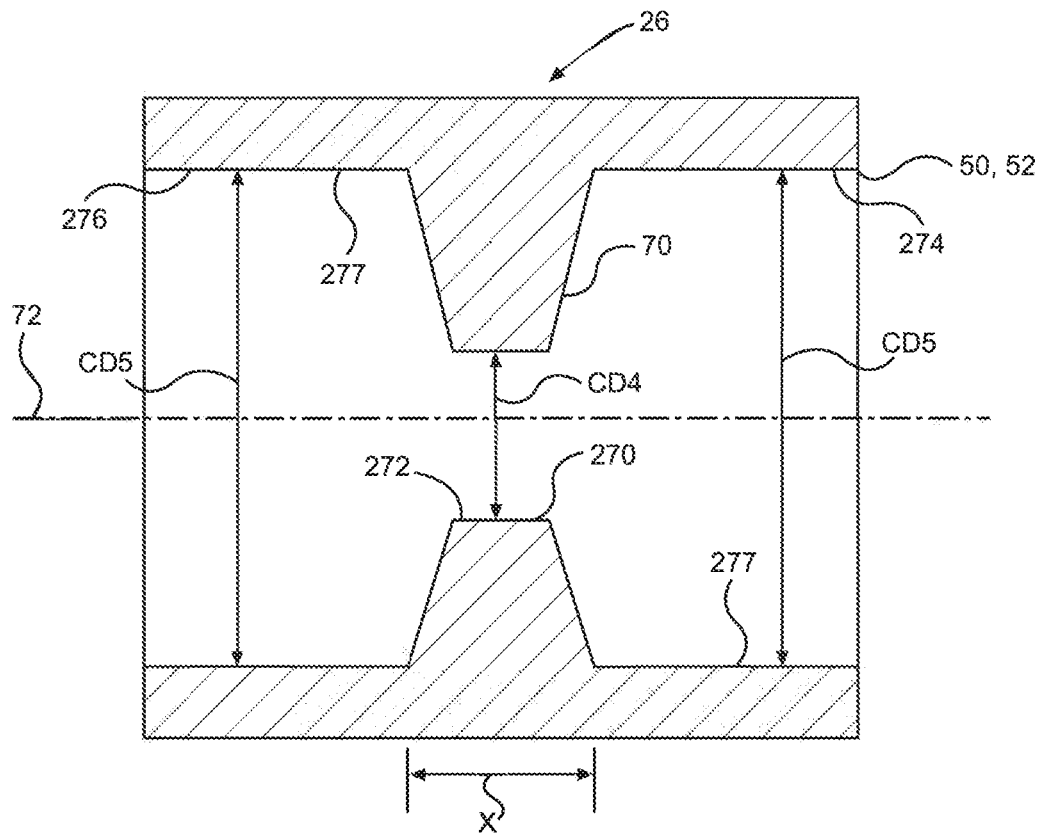
FIG. 20 is a cross-sectional view through a cable port of the cable seal of FIG. 1.

FIG. 20 is a cross-sectional view of one of the cable ports 50, 52 of the sealing unit 26. The cable sealing rib 70 of the depicted port 50, 52 includes a cable sealing surface 270 that surrounds the port axis 72 and that faces radially toward the port axis 72. The cable sealing surface 270 defines a cable opening 272 having a cross-dimension CD4 (e.g., a diameter). The port 50, 52 includes enlarged inner and outer pockets 274, 276 positioned on opposite side of the sealing rib 70. The inner and outer pockets 274, 276 are co-axially aligned with each other and with the cable opening 272. The sealing rib 70 is positioned axially between the inner and outer pockets 274, 276 and separates the inner and outer pockets 274, 276 from one another. Each of the inner and outer pockets 274, 276 includes a circumferential pocket surface 277 that surrounds the port axis 72 and that faces radially toward the port axis 72. The circumferential pocket surfaces 277 each define a cross-dimension CD5 (e.g., a diameter). The cross-dimension CD4 of the cable opening 272 is larger than the cross-dimension CD2 of the plug-head spacer 224 and smaller than the cross-dimension CD5 defined by the inner and outer pockets 274, 276. The cross-dimension CD5 defined by the inner and outer pockets 274, 276 is slightly smaller than the cross-dimension CD3 of the radial sealing flanges 230. The cable sealing surface 270 and the circumferential pocket surfaces 277 are defined by the sealing material 62 of the sealing unit 26.

Figure 22:
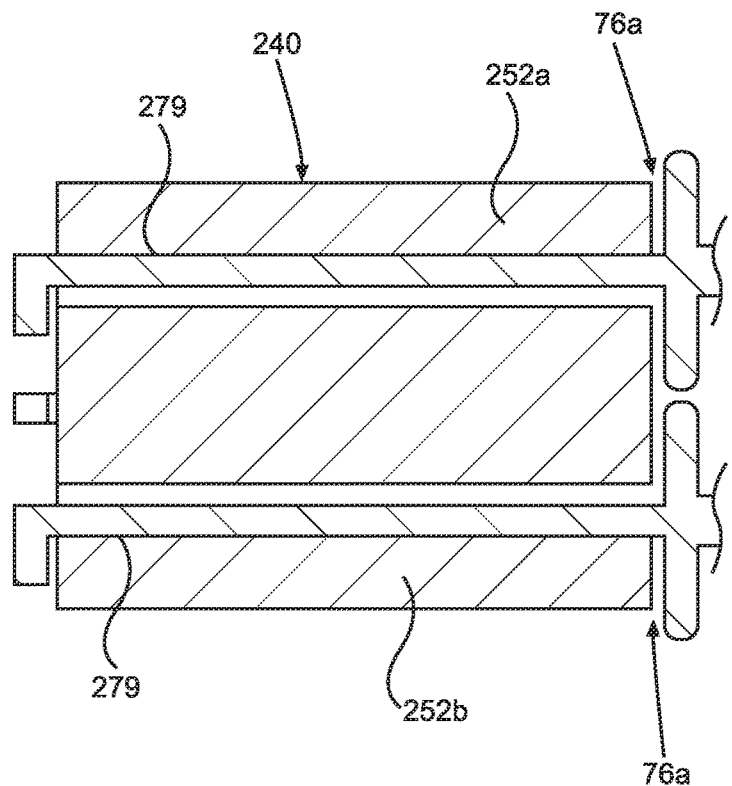
FIG. 22 is a cross-sectional view depicting the cable spacer of FIG. 19 retained between retainers of plugs of the type shown at FIG. 18.

It will be appreciated that plugs 76a can be installed into the cable sealing unit 26 by moving the sealing unit 26 from the closed position to the open position, loading the plug 76a into the ports 50, 52 while the sealing unit is in the open position, and then moving the sealing unit from the open position to the closed position to capture the plugs 76a within the ports 50, 52. Once the plugs 76a are installed in the ports 50, 52, the sealing unit 26 can be installed in its corresponding enclosure. In certain examples, the plugs 76a can include exterior securing members 279 (e.g., arms, hooks, fasteners, snap-fit elements, tethers, straps, links, etc.) for coupling the cable spacer 240 to the sealing unit 26 when no cables have been routed through the sealing unit 26. The securing members 279 can project axially in an outward direction from the centers of the outer sealing heads 222 of the plugs 76a. The securing members 279 can fit within the channels 252a, 252b of the cable spacer 240 such that a mid-region of the cable spacer 240 is captured between the securing members thereby securing the cable spacer 240 to the sealing unit 26 via the plugs 76a (see FIG. 22). When the sealing unit 26 is mounted in the enclosure, the cable spacer 240 remains coupled to the sealing unit 26 and is thus also coupled to the enclosure thereby eliminating loose parts. When it is desired to install cables through the ports 50, 52, the enclosure is opened and the sealing unit 26 is removed. Once the sealing unit 26 is removed, the sealing unit 26 can be opened to remove the plugs 76a and the cable spacer 240 is detached from the sealing unit 26. Cables are then routed through the ports 50, 52 and the sealing unit 26 can be re-installed in the enclosure. The cable spacer 240 can then be mounted on the cables adjacent to the cable sealing unit 26 (see FIG. 23) to maintain co-axial alignment of portions of the cables with the ports 50, 52 of the cable sealing unit 26.

Figure 21:
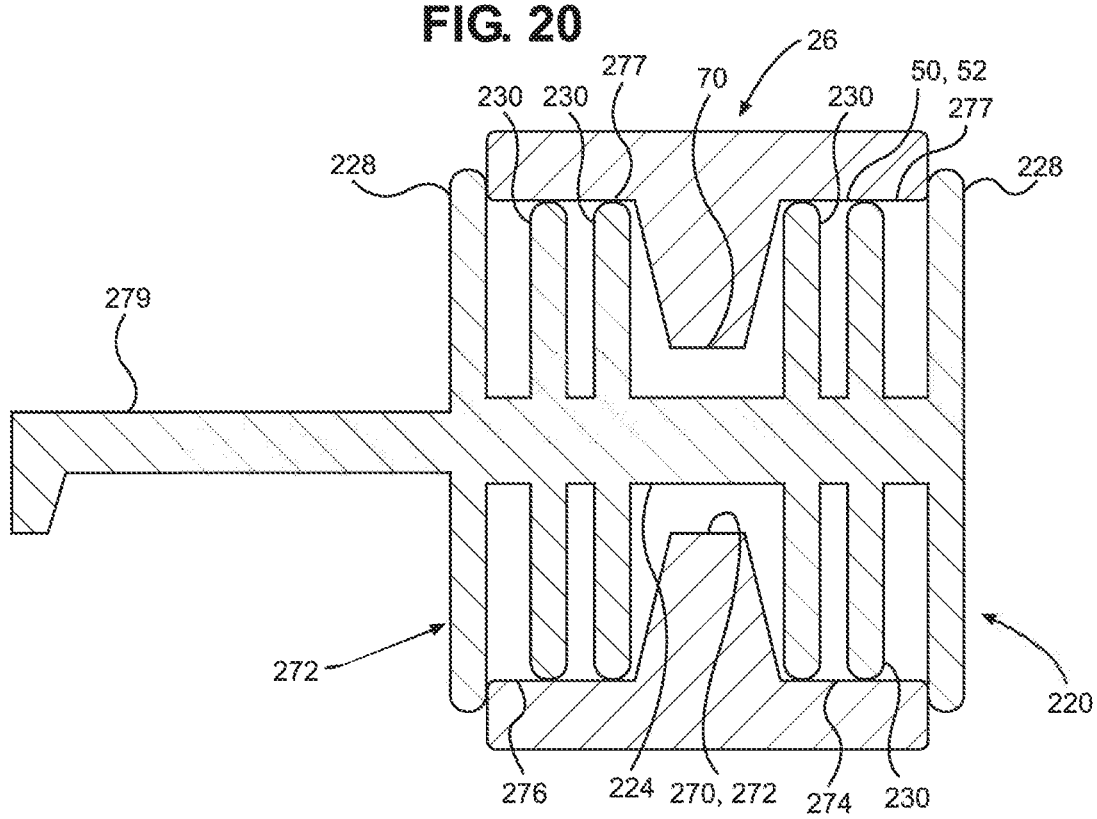
FIG. 21 is a cross-sectional view depicting the cable port of FIG. 20 with the plug of FIG. 18 mounted therein.

FIG. 21 shows the plug 76a installed within one of the cable ports 50, 52. As installed, the inner sealing head 220 fits within the inner pocket 274, the outer sealing head 222 fits within the outer pocket 276, and the plug-head spacer 224 extends through the cable opening 272 defined by the sealing rib 70. The fixed axial spacing S1 defined between the sealing heads 220, 222 is preferably larger than an axial thickness X of the sealing rib 70 to prevent contact between the sealing heads 220, 222 and the sealing rib 70. The axial stop flanges 228 oppose inner and outer axial faces of the sealing unit 28 to limit axial movement of the plug 76a within the port 50, 52 and to prevent the sealing heads 220, 222 from contacting the sealing rib 70. Outer circumferential surfaces of the radial sealing flanges 230 press within the circumferential pocket surfaces 277 of the inner and outer pockets 274, 276 to form radial seals within the inner and outer pockets 274, 276 for preventing moisture, dust or other contaminants from intruding through the port 50, 52 of the sealing unit. The sealing flanges 230 also assist in maintaining co-axial alignment of the plug 76a within the port 50, 52. The cross-dimension CD2 of the plug-head spacer 224 is smaller than the cross-dimension CD4 of the cable opening 272 such that the plug-head spacer 224 does not contact the cable sealing surface 270 of the cable sealing rib 70. Preferably, the plug 76a does not physically contact the sealing rib 70 or the cable sealing surface 270 so that the sealing rib 70 and cable sealing surface 270 are protected and remain in their original shape and physical/chemical state over time. The plug configuration preferably limits the effect of seal aging and preserves seal integrity so that the sealing surface 270 and the sealing rib 70 do not experience degraded sealing properties over time.

In certain implementations, sealant material for use in applications of the type disclosed herein includes a hydrolyzation cured vinyl-terminated polydimethylsiloxane (PDMS) gel or rubber. Additional information on such a material can be found in U.S. Pat. No. 8,642,891, the disclosure of which is hereby incorporated herein by reference in its entirety. In one example, the sealing material can be made by reacting a cross-linker, a chain extender and a vinyl-terminated polydimethylsiloxane (PDMS). In other implementations, sealant material for use in applications of the type disclosed herein include peroxide or heat cured vinyl-terminated PDMS material. In other implementations, sealant material for use in applications of the type disclosed herein includes moisture (and/or UV) cured PDMS material (various terminations possible, including silanol). In other implementations, sealant material for use in applications of the type disclosed herein includes moisture (and/or UV) cured, silylated polyether (commonly "MS polymer") material. In certain implementations, the material includes polyether or polyester based polyurethane. In other implementations, sealant material for use in applications of the type disclosed herein includes chemically cross-linked polyacrylate (acrylic or methacrylic) e.g. n-butyl acrylate or ethyl-hexyl acrylate with triethylene glycol dimethacrylate. In other implementations, sealant material for use in applications of the type disclosed herein includes ionically cross-linked rubber. In other implementations, sealant material for use in applications of the type disclosed herein includes chemically cross-linked SBS (poly(styrene-butadiene-styrene) family TPE gel (crosslinks in polystyrene phase only) or SBS family TPE rubber. In other implementations, sealant material for use in applications of the type disclosed herein includes physically cross-linked triblock polyacrylate material (e.g. Kurarity®). In other implementations, sealant material for use in applications of the type disclosed herein includes physically cross-linked triblock olefin material (e.g. Infuse). In other examples, the sealant material can include a thermoplastic elastomer such as a styrenic block copolymer including polystyrene blocks and rubber blocks with an extender such as oil. Examples of rubber blocks can include polybutadiene, polyisoprene or their hydrogenated equivalents. In other implementations, sealant material for use in applications of the type disclosed herein includes hybrids and/or multiple combinations of above chemistries.

We claim:

1. A cable seal adapted for sealing a cable entrance/exit location of a telecommunications enclosure, the cable seal comprising:

a sealing unit including a first major side positioned opposite from a second major side, the first and second major sides being separated by a thickness of the sealing unit, the sealing unit having a profile defining a major axis and a minor axis, the sealing unit profile defining a length that extends along the major axis between opposite first and second ends of the sealing unit, the profile defining a width that extends along the minor axis between opposite first and second sides of the sealing unit, the first end of the sealing unit being rounded, the sealing unit including first and second sealing flanges adjacent the second end of the sealing unit that respectively project outwardly from the first and second sides of the sealing unit in an orientation along the minor axis, the sealing unit further including first and second cable ports that are aligned along the major axis and that extend through the thickness of the sealing unit, the sealing unit including a peripheral surface that extends about a perimeter of the sealing unit, the perimeter of the sealing unit extends around the first and second ends as well as the first and second sides of the sealing unit;

the sealing unit having a composite construction including a frame material and a sealing material, the sealing material being molded over and through the frame material, the frame material being harder than the sealing material, the sealing material lining the first and second cable ports and defining at least a portion of the peripheral surface of the sealing unit that extends along the first and second sides and the first end of the sealing unit, the frame material and the sealing material cooperating to define each of the first and second sealing flanges; and wherein outermost extent portions of the first and second sealing flanges are defined only by the sealing material.

2. The cable seal of claim 1, wherein the sealing material has a hardness of 15 Shore A or softer.

3. The cable seal of claim 1, wherein the sealing material has a hardness in a range of 5-15 Shore A.

4. The cable seal of claim 1, wherein the sealing material includes a thermoplastic elastomeric rubber, a thermoset elastomeric rubber, a thermoplastic elastomeric gel or a thermoset elastomeric gel.

5. The cable seal of claim 1, wherein the frame material includes a thermoplastic or thermoset elastomeric rubber.

6. The cable seal of claim 1, wherein the frame material has a hardness of 30 Shore A or harder.

7. The cable seal of claim 6, wherein the frame material has a hardness in a range of 30-60 Shore A.

8. The cable seal of claim 1, wherein the sealing material defines a peripheral groove that extends about at least a portion of the perimeter of the sealing unit for holding lubricant.

9. The cable seal of claim 1, wherein the sealing unit profile is tapered such that the width decreases as the sealing unit extends toward the first end of the sealing unit.

10. The cable seal of claim 1, wherein the first and second cable ports define port axes, and wherein the sealing material defines circumferential cable sealing ribs at the first and second ports that encircle the port axes.

11. The cable seal of claim 1, wherein the outermost extent portions of the first and second sealing flanges defined only by the sealing material have an outermost extent dimension along the minor axis that is less than or equal to 2 millimeters.

12. The cable seal of claim 11, wherein the outermost extent dimension is less than or equal to 1 millimeter.

13. The cable seal of claim 1, wherein at the first and second sealing flanges, the frame material is configured to prevent the sealing material from being over-compressed.

14. The cable seal of claim 13, wherein the first and second flanges each include a flange height that extends in an orientation along the major axis of the sealing unit, and wherein each of the first and second flanges includes a region in which the frame material defines the flange height.

15. The cable seal of claim 14, wherein the regions of the first and second sealing flanges are rails between which the sealing material is contained.

16. The cable seal of claim 15, wherein the rails extend from base ends of the first and second flanges along the minor axis of the sealing unit to outermost extent portions of the first and second flanges.

17. The cable seal of claim 1, wherein the frame material defines a section of the peripheral surface of the sealing unit that extends along the minor axis of the sealing unit at the second end of the sealing unit.

18. The cable seal of claim 1, wherein the sealing unit includes a pre-defined access slit that extends along the major axis of the sealing unit from the second end of the sealing unit, through the second cable port and into the first cable port.

19. The cable seal of claim 18, wherein the access slit allows the sealing unit to be flexed about a flexation region adjacent the first end of the sealing unit between open and closed orientations.

20. The cable seal of claim 1, wherein the sealing material has a hardness in the range of 5-20 Shore A, and the frame material has a hardness equal to or greater than 30 Shore A.

21. The cable seal of claim 1, wherein the frame material has a composition that includes polyethylene or polypropylene.

22. The cable seal of claim 1, wherein the seal material has a composition that includes a styrenic block polymer.

23. The cable seal of claim 1, wherein the frame material has a composition that includes a blend of a plastic material and a thermoplastic elastomer rubber.

24. The cable seal of claim 23, wherein the composition of the frame material includes 70-95 percent of the plastic polymer and 5-30 percent of the thermoplastic elastomer rubber.

25. The cable seal of claim 24, wherein the plastic material includes polyethylene or polypropylene and the thermoplastic elastomer rubber includes a styrenic block copolymer.

26. The cable seal of claim 1, further comprising a cable spacer for maintaining spacing between cables routed through the first and second cable ports, the cable spacer including first and second cable-receiving channels that are parallel and that extend along a length of the cable spacer between first and second ends of the cable spacer, the cable-receiving channels having open sides that extend along the length of the spacer and face in opposite directions.

27. The cable seal of claim 26, wherein the spacer has a composite construction including a frame that supports a cable gripping material that defines the first and second cable-receiving channels, the frame having a harder construction than the cable gripping material.

28. The cable seal of claim 27, wherein the cable spacer includes a first part that defines a first half of each of the first and second cable-receiving channels and a second part that defines a second half of each of the first and second cable-receiving channels, and wherein the first and second parts are connected by a hinge at one of the first and second ends of the cable spacer.

29. The cable seal of claim 1, further comprising a plug for temporarily blocking one of the first and second cable ports, the plug including first and second enlarged sealing heads that are co-axially aligned and axially separated from one another by a plug-head spacer having a cross-dimension smaller than a cross-dimension of the enlarged sealing heads.

30. The cable seal of claim 29, wherein the plug-head spacer is centered in the first or second cable port and does not make physical contact with the sealing material of the sealing unit of the cable seal.

31. The cable seal of claim 29, wherein the plug includes an exterior securing member for securing a cable spacer to the sealing unit.

32. The cable seal of claim 30, wherein each of the enlarged sealing heads includes a plurality of axially spaced-part sealing flanges and an axial stop flange, wherein the sealing flanges have smaller cross-dimensions than the axial stop flanges and are located between the axial stop flanges and the plug-head spacer.

33. A cable seal adapted for sealing a cable entrance/exit location of a telecommunications enclosure, the cable seal comprising:

a sealing unit including a first major side positioned opposite from a second major side, the first and second major sides being separated by a thickness of the sealing unit, the sealing unit having a profile defining a major axis and a minor axis, the sealing unit profile defining a length that extends along the major axis between opposite first and second ends of the sealing unit, the profile defining a width that extends along the minor axis between opposite first and second sides of the sealing unit, the first end of the sealing unit being rounded, the sealing unit including first and second sealing flanges adjacent the second end of the sealing unit that respectively project outwardly from the first and second sides of the sealing unit in an orientation along the minor axis, the sealing unit further including at least one cable port aligned along the major axis and that extends through the thickness of the sealing unit, the sealing unit including a peripheral surface that extends about a perimeter of the sealing unit which extends around the first and second ends as well as the first and second sides of the sealing unit; and the sealing unit having a composite construction including a frame material and a sealing material, the sealing material being molded over and through the frame material, the frame material being harder than the sealing material, the sealing material lining the at least one cable port and defining at least a portion of the peripheral surface that extends along the first and second sides and the first end of the sealing unit, the frame material and the sealing material cooperating to define the first and second sealing flanges;

wherein the sealing material defines a flexation region at the first end of the sealing unit for flexing the sealing unit between open and closed orientations, and wherein the frame material includes first and second frame pieces positioned on opposite sides of the flexation region;

wherein the sealing material is initially molded in a flat configuration with the first and second frame pieces being overmolded by the sealing material when the sealing material is molded in the flat configuration, wherein the flat configuration corresponds to the open orientation, and wherein a neutral state of the sealing unit is in the open orientation; and wherein the sealing material includes a plurality of axially spaced-apart cable sealing ribs that extend circumferentially around the at least one cable port or ports when the sealing unit is in the closed orientation, wherein inner grooves are defined between the cable sealing ribs.

34. The cable seal of claim 33, wherein the sealing material includes a plurality of axially spaced-apart peripheral sealing ribs that extend along the first and second sides and around first end of the sealing unit when the sealing unit is in the closed orientation, wherein outer grooves are defined between the peripheral sealing ribs.

35. The cable seal of claim 34, wherein the inner and outer grooves contain lubricant.

36. The cable seal of claim 35, wherein the lubricant is factory installed in the inner and outer grooves.

37. A cable seal adapted for sealing a cable entrance/exit location of a telecommunications enclosure, the cable seal comprising:

a sealing unit including a first major side positioned opposite from a second major side, the first and second major sides being separated by a thickness of the sealing unit, the sealing unit having a profile defining a major axis and a minor axis, the sealing unit profile defining a length that extends along the major axis between opposite first and second ends of the sealing unit, the profile defining a width that extends along the minor axis between opposite first and second sides of the sealing unit, the first end of the sealing unit being rounded, the sealing unit including first and second sealing flanges adjacent the second end of the sealing unit that respectively project outwardly from the first and second sides of the sealing unit in an orientation along the minor axis, the sealing unit further including first and second cable ports that are aligned along the major axis and that extend through the thickness of the sealing unit, the sealing unit including a peripheral surface that extends about a perimeter of the sealing unit, the perimeter of the sealing unit extends around the first and second ends as well as the first and second sides of the sealing unit;

the sealing unit having a composite construction including a frame material and a sealing material, the sealing material being molded over and through the frame material, the frame material being harder than the sealing material, the sealing material lining the first and second cable ports and defining at least a portion of the peripheral surface of the sealing unit that extends along the first and second sides and the first end of the sealing unit, the frame material and the sealing material cooperating to define each of the first and second sealing flanges;

wherein at the first and second sealing flanges, the frame material is configured to prevent the sealing material from being over-compressed; and wherein the first and second flanges each include a flange height that extends in an orientation along the major axis of the sealing unit, and wherein each of the first and second flanges includes a region in which the frame material defines the flange height.

38. The cable seal of claim 37, wherein the regions of the first and second sealing flanges are rails between which the sealing material is contained.

39. The cable seal of claim 38, wherein the rails extend from base ends of the first and second flanges along the minor axis of the sealing unit to outermost extent portions of the first and second flanges.

40. A cable seal adapted for sealing a cable entrance/exit location of a telecommunications enclosure, the cable seal comprising:

a sealing unit including a first major side positioned opposite from a second major side, the first and second major sides being separated by a thickness of the sealing unit, the sealing unit having a profile defining a major axis and a minor axis, the sealing unit profile defining a length that extends along the major axis between opposite first and second ends of the sealing unit, the profile defining a width that extends along the minor axis between opposite first and second sides of the sealing unit, the first end of the sealing unit being rounded, the sealing unit including first and second sealing flanges adjacent the second end of the sealing unit that respectively project outwardly from the first and second sides of the sealing unit in an orientation along the minor axis, the sealing unit further including first and second cable ports that are aligned along the major axis and that extend through the thickness of the sealing unit, the sealing unit including a peripheral surface that extends about a perimeter of the sealing unit, the perimeter of the sealing unit extends around the first and second ends as well as the first and second sides of the sealing unit;

the sealing unit having a composite construction including a frame material and a sealing material, the sealing material being molded over and through the frame material, the frame material being harder than the sealing material, the sealing material lining the first and second cable ports and defining at least a portion of the peripheral surface of the sealing unit that extends along the first and second sides and the first end of the sealing unit, the frame material and the sealing material cooperating to define each of the first and second sealing flanges;

and wherein the frame material has a composition that includes a blend of a plastic material and a thermoplastic elastomer rubber.

41. The cable seal of claim 40, wherein the composition of the frame material includes 70-95 percent of the plastic polymer and 5-30 percent of the thermoplastic elastomer rubber.

42. The cable seal of claim 41, wherein the plastic material includes polyethylene or polypropylene and the thermoplastic elastomer rubber includes a styrenic block copolymer.

43. A cable seal adapted for sealing a cable entrance/exit location of a telecommunications enclosure, the cable seal comprising:

a sealing unit including a first major side positioned opposite from a second major side, the first and second major sides being separated by a thickness of the sealing unit, the sealing unit having a profile defining a major axis and a minor axis, the sealing unit profile defining a length that extends along the major axis between opposite first and second ends of the sealing unit, the profile defining a width that extends along the minor axis between opposite first and second sides of the sealing unit, the first end of the sealing unit being rounded, the sealing unit including first and second sealing flanges adjacent the second end of the sealing unit that respectively project outwardly from the first and second sides of the sealing unit in an orientation along the minor axis, the sealing unit further including first and second cable ports that are aligned along the major axis and that extend through the thickness of the sealing unit, the sealing unit including a peripheral surface that extends about a perimeter of the sealing unit, the perimeter of the sealing unit extends around the first and second ends as well as the first and second sides of the sealing unit;

the sealing unit having a composite construction including a frame material and a sealing material, the sealing material being molded over and through the frame material, the frame material being harder than the sealing material, the sealing material lining the first and second cable ports and defining at least a portion of the peripheral surface of the sealing unit that extends along the first and second sides and the first end of the sealing unit, the frame material and the sealing material cooperating to define each of the first and second sealing flanges;

a cable spacer for maintaining spacing between cables routed through the first and second cable ports, the cable spacer including first and second cable-receiving channels that are parallel and that extend along a length of the cable spacer between first and second ends of the cable spacer, the cable-receiving channels having open sides that extend along the length of the spacer and face in opposite directions; and wherein the spacer has a composite construction including a frame that supports a cable gripping material that defines the first and second cable-receiving channels, the frame having a harder construction than the cable gripping material.

44. The cable seal of claim 43, wherein the cable spacer includes a first part that defines a first half of each of the first and second cable-receiving channels and a second part that defines a second half of each of the first and second cable-receiving channels, and wherein the first and second parts are connected by a hinge at one of the first and second ends of the cable spacer.

45. A cable seal adapted for sealing a cable entrance/exit location of a telecommunications enclosure, the cable seal comprising:

a sealing unit including a first major side positioned opposite from a second major side, the first and second major sides being separated by a thickness of the sealing unit, the sealing unit having a profile defining a major axis and a minor axis, the sealing unit profile defining a length that extends along the major axis between opposite first and second ends of the sealing unit, the profile defining a width that extends along the minor axis between opposite first and second sides of the sealing unit, the first end of the sealing unit being rounded, the sealing unit including first and second sealing flanges adjacent the second end of the sealing unit that respectively project outwardly from the first and second sides of the sealing unit in an orientation along the minor axis, the sealing unit further including first and second cable ports that are aligned along the major axis and that extend through the thickness of the sealing unit, the sealing unit including a peripheral surface that extends about a perimeter of the sealing unit, the perimeter of the sealing unit extends around the first and second ends as well as the first and second sides of the sealing unit;

the sealing unit having a composite construction including a frame material and a sealing material, the sealing material being molded over and through the frame material, the frame material being harder than the sealing material, the sealing material lining the first and second cable ports and defining at least a portion of the peripheral surface of the sealing unit that extends along the first and second sides and the first end of the sealing unit, the frame material and the sealing material cooperating to define each of the first and second sealing flanges;

a plug for temporarily blocking one of the first and second cable ports, the plug including first and second enlarged sealing heads that are co-axially aligned and axially separated from one another by a plug-head spacer having a cross-dimension smaller than a cross-dimension of the enlarged sealing heads; and wherein the plug-head spacer is centered in the first or second cable port and does not make physical contact with the sealing material of the sealing unit of the cable seal.

46. The cable seal of claim 45, wherein the plug includes an exterior securing member for securing a cable spacer to the sealing unit.

47. The cable seal of claim 45, wherein each of the enlarged sealing heads includes a plurality of axially spaced-part sealing flanges and an axial stop flange, wherein the sealing flanges have smaller cross-dimensions than the axial stop flanges and are located between the axial stop flanges and the plug-head spacer.

* * * * *